US012055063B2

(12) United States Patent
Bullinger et al.

(10) Patent No.: US 12,055,063 B2
(45) Date of Patent: Aug. 6, 2024

(54) METHOD FOR CARRYING OUT SERVICING MEASURES ON AN ENERGY CONVERSION INSTALLATION

(71) Applicant: Siemens Energy Global GmbH & Co. KG, Bayern (DE)

(72) Inventors: Patrick Bullinger, Schwaig (DE); Martin Großhäuser, Erlangen (DE); Andreas Pahl, Düsseldorf (DE); Dietmar Reiermann, Potsdam (DE); Michael Rindler, Schöneiche (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 389 days.

(21) Appl. No.: 17/609,378

(22) PCT Filed: Apr. 22, 2020

(86) PCT No.: PCT/EP2020/061141
§ 371 (c)(1),
(2) Date: Nov. 6, 2021

(87) PCT Pub. No.: WO2020/233925
PCT Pub. Date: Nov. 26, 2020

(65) Prior Publication Data
US 2022/0316339 A1 Oct. 6, 2022

(30) Foreign Application Priority Data
May 22, 2019 (DE) ..................... 10 2019 207 479.0

(51) Int. Cl.
*F01D 5/00* (2006.01)
*F01D 5/18* (2006.01)

(52) U.S. Cl.
CPC ............... *F01D 5/005* (2013.01); *F01D 5/18* (2013.01); *F05D 2220/72* (2013.01); *F05D 2230/80* (2013.01)

(58) Field of Classification Search
CPC . F01D 5/005; F01D 5/18; F01D 5/284; F01D 5/286; F01D 5/288; F05D 2220/72; F05D 2230/80; F05D 2230/90
See application file for complete search history.

(56) References Cited

U.S. PATENT DOCUMENTS 6,024,792 A 2/2000 Kurz et al.
2014/0263579 A1 9/2014 Kulkarni et al.
2017/0009584 A1 * 1/2017 Cui ........................... F01D 5/20

FOREIGN PATENT DOCUMENTS

EP 0486489 B1 11/1994
EP 0412397 B1 3/1998
(Continued)

OTHER PUBLICATIONS

Lechner, C. et al; "Stationäre Gasturbinen"; 3. edition; Springer-Verlag; pp. 38-39, 352, 421, 475, 493, 659, 664-667, 671-673; ISBN: 9783662561348; 2018; ["Stationary Gas Turbines"; 3rd edition, English machine translation attached].
(Continued)

*Primary Examiner* — Rick K Chang
(74) *Attorney, Agent, or Firm* — Wolter Van Dyke Davis, PLLC

(57) ABSTRACT

A method for optimizing energy conversion installation service measures, wherein the energy conversion installation has at least the following machines: at least one gas turbine; at least one generator; and optionally at least one steam turbine; wherein repairs are carried out on the at least one machine, in particular a defective component or defective components of the at least one machine either is/are or will be replaced by a new, identical component or new, identical
(Continued)

components and/or repaired; and wherein, while carrying out these repairs, further measures for extending the service life of machines or the components thereof and/or further measures for optimizing machines or the components thereof are carried out.

18 Claims, 16 Drawing Sheets

(56) References Cited

FOREIGN PATENT DOCUMENTS

| | | | |
|---|---|---|---|
| EP | 0892090 | A1 | 1/1999 |
| EP | 0786017 | B1 | 3/1999 |
| EP | 1217189 | A1 | 6/2002 |
| EP | 1306454 | A1 | 5/2003 |
| EP | 1319729 | A1 | 6/2003 |
| EP | 1204776 | B1 | 6/2004 |
| EP | 1533396 | A2 | 5/2005 |
| EP | 1591549 | A1 | 11/2005 |
| WO | 9967435 | A1 | 12/1999 |
| WO | 0044949 | A1 | 8/2000 |
| WO | 2004097180 | A1 | 11/2004 |

OTHER PUBLICATIONS

PCT International Search Report and Written Opinion of International Searching Authority mailed Jul. 27, 2020 corresponding to PCT International Application No. PCT/EP2020/061141 filed Apr. 22, 2020.

* cited by examiner

FIG 4

| Material | chemical composition in % | | | | | | | | | | | | |
|---|---|---|---|---|---|---|---|---|---|---|---|---|---|
| | C | Cr | Ni | Co | Mo | W | Ta | Nb | Al | Ti | B | Zr | Hf |
| Ni-based precision casting alloys | | | | | | | | | | | | | |
| GTD 222 | 0.10 | 22.5 | Rem. | 19.0 | | 2.0 | 1.0 | | 1.2 | 2.3 | 0.008 | | |
| IN 939 | 0.15 | 22.4 | Rem. | 19.0 | | 2.0 | 1.4 | 1.0 | 1.9 | 3.7 | 0.009 | 0.10 | |
| IN 6203 DS | 0.15 | 22.0 | Rem. | 19.0 | | 2.0 | 1.1 | 0.8 | 2.3 | 3.5 | 0.010 | 0.10 | 0.75 |
| Udimet 500 | 0.10 | 18.0 | Rem. | 18.5 | 4.0 | | | | 2.9 | 2.9 | 0.006 | 0.05 | |
| IN 738 LC | 0.10 | 16.0 | Rem. | 8.5 | 1.7 | 2.6 | 1.7 | 0.9 | 3.4 | 3.4 | 0.010 | 0.10 | |
| SC 16 | <0.01 | 16.0 | Rem. | | 3.0 | | 3.5 | | 3.5 | 3.5 | <0.005 | <0.008 | |
| Rene 80 | 0.17 | 14.0 | Rem. | 9.5 | 4.0 | 4.0 | | | 3.0 | 5.0 | 0.015 | 0.03 | |
| GTD 111 | 0.10 | 14.0 | Rem. | 9.5 | 1.5 | 3.8 | 2.8 | | 3.0 | 4.9 | 0.012 | 0.03 | |
| GTD 111 DS | | | | | | | | | | | | | |
| IN 792 CC | 0.08 | 12.5 | Rem. | 9.0 | 1.9 | 4.1 | 4.1 | | 3.4 | 3.8 | 0.015 | 0.02 | |
| IN 792 DS | 0.08 | 12.5 | Rem. | 9.0 | 1.9 | 4.1 | 4.1 | | 3.4 | 3.8 | 0.015 | 0.02 | 1.00 |
| MAR M 002 | 0.15 | 9.0 | Rem. | 10.0 | | 10.0 | 2.5 | | 5.5 | 1.5 | 0.015 | 0.05 | 1.50 |
| MAR M 247 LC DS | 0.07 | 8.1 | Rem. | 9.2 | 0.5 | 9.5 | 3.2 | | 5.6 | 0.7 | 0.015 | 0.02 | 1.40 |
| CMSX-2 | <.006 | 8.0 | Rem. | 4.6 | 0.6 | 8.0 | 6.0 | | 5.6 | 1.0 | <.003 | <.0075 | |
| CMSX-3 | <.006 | 8.0 | Rem. | 4.6 | 0.6 | 8.0 | 6.0 | | 5.6 | 1.0 | <.003 | <.0075 | 0.10 |
| CMSX-4 | | 6.0 | Rem. | 10.0 | 0.6 | 6.0 | 6.0 | | 5.6 | 1.0 | | Re=3.0 | 0.10 |
| CMSX-6 | <.015 | 10.0 | Rem. | 5.0 | 3.0 | <.10 | 2.0 | <.10 | 4.9 | 4.8 | <.003 | <.0075 | 0.10 |
| PWA 1480 SX | <.006 | 10.0 | Rem. | 5.0 | | 4.0 | 12.0 | | 5.0 | 1.5 | <.0075 | <.0075 | |
| PWA 1483 SX | 0.07 | 12.2 | Rem. | 9.0 | 1.9 | 3.8 | 5.0 | | 3.6 | 4.2 | 0.0001 | 0.002 | |
| Co-based precision casting alloys | | | | | | | | | | | | | |
| FSX 414 | 0.25 | 29.0 | 10 | Rem. | | 7.5 | | | | | 0.010 | | |
| X 45 | 0.25 | 25.0 | 10 | Rem. | | 8.0 | | | | | 0.010 | | |
| ECY 768 | 0.65 | 24.0 | 10 | 51.7 | | 7.5 | 4.0 | | 0.25 | 0.3 | 0.010 | 0.05 | |
| MAR-M-509 | 0.65 | 24.5 | 11 | Rem. | | 7.5 | 4 | | | 0.3 | 0.010 | 0.60 | |
| CM 247 | 0.07 | 8.3 | Rem. | 10.0 | 0.5 | 9.5 | 3.2 | | 5.5 | 0.7 | | | 1.5 |

METHOD FOR CARRYING OUT SERVICING MEASURES ON AN ENERGY CONVERSION INSTALLATION

CROSS REFERENCE TO RELATED APPLICATIONS

This application is the US National Stage of International Application No. PCT/EP2020/061141 filed 22 Apr. 2020, and claims the benefit thereof. The International Application claims the benefit of German Application No. DE 10 2019 207 479.0 filed 22 May 2019. All of the applications are incorporated by reference herein in their entirety.

FIELD OF INVENTION

The invention relates to a method for carrying out servicing measures on an energy conversion installation, and to an energy conversion installation.

BACKGROUND OF INVENTION

Various requirements are set for gas turbines in energy conversion installations.

Said gas turbines can be machines for supplying the basic demand, or for compensating load changes, in particular by virtue of renewable energy sources, the input by the latter into the grid being variable. Requirements can be different locations, cooling possibilities, fuels, etc.

There are moreover also various requirements set for the desired service intervals or for modifications and improvements by virtue of different initial models.

SUMMARY OF INVENTION

It is therefore an object of the invention to specify modifications which correspond to different operating conditions or customer requirements.

The object is achieved by a method, and by an energy conversion installation, in which object or method a corresponding existing gas turbine is provided or correspondingly modified or newly manufactured, respectively.

Further advantageous measures which can be combined with one another in an arbitrary manner in order to achieve further advantages are set forth in the dependent claims.

BRIEF DESCRIPTION OF THE DRAWINGS

In the figures:

FIG. 4 shows a list of superalloys;

DETAILED DESCRIPTION OF INVENTION

The figures and the description represent only exemplary embodiments of the invention.

Figure 1:
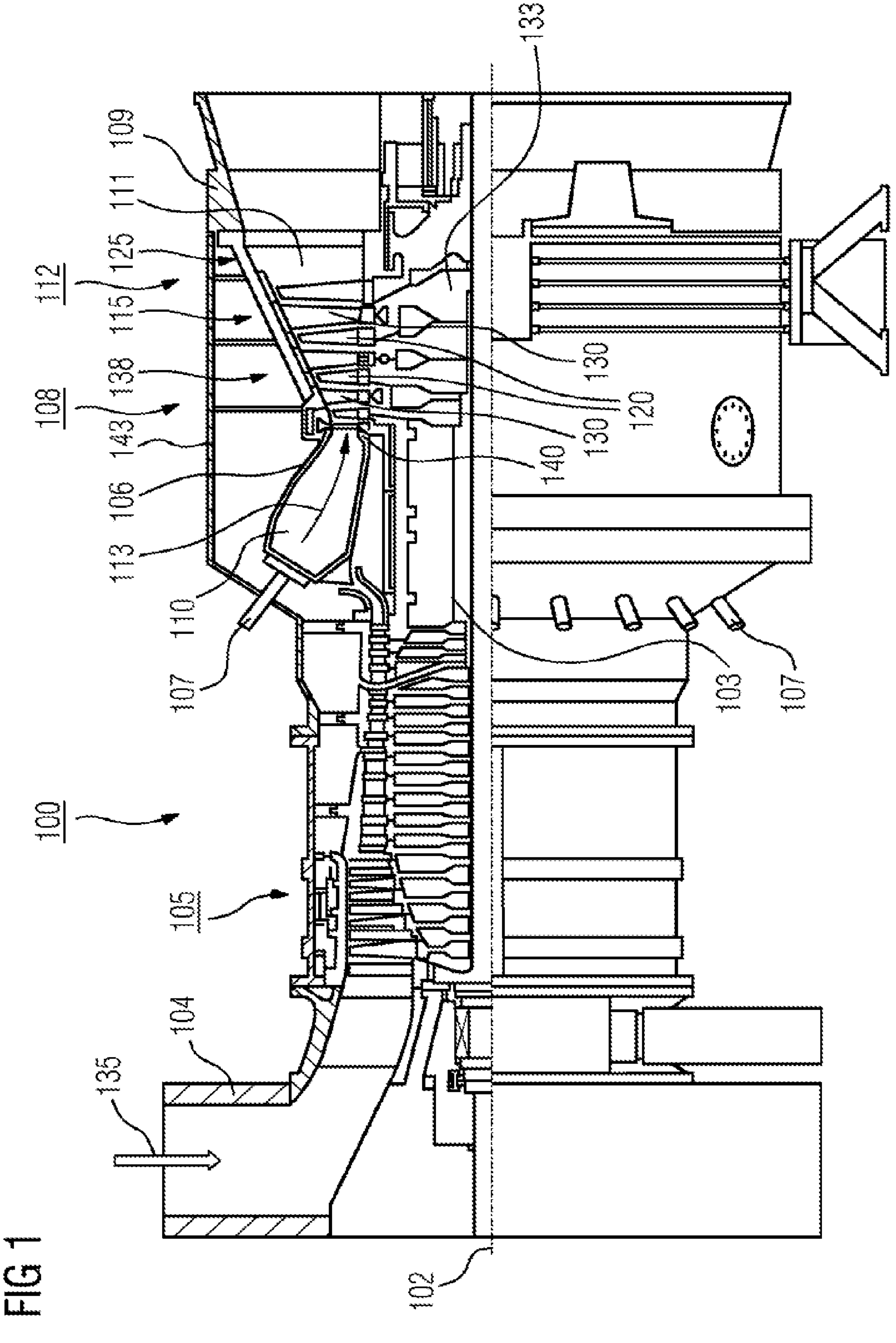
FIG. 1 shows a gas turbine.

FIG. 1 in an exemplary manner shows a gas turbine machine 100 in a partial longitudinal section.

The gas turbine machine 100 in the interior has a rotor 103 which is mounted so as to be rotatable about a rotation axis 102 and has a turbine blade 120, said rotor 103 also being referred to as the turbine rotor.

Along the rotor 103 there are in sequence an intake housing 104, a compressor 105, a combustion chamber 110, in particular an annular combustion chamber, which in an exemplary manner is shaped in the manner of a torus and has a plurality of coaxially disposed burners 107, a turbine 108, and the exhaust gas housing 109.

The annular combustion chamber 110 communicates with a advantageously annular hot-gas duct 111. In the latter, for example four sequential turbine stages 112 form the turbine 108.

Each turbine stage 112: I, II, III, IV is advantageously formed from two blade rings.

When viewed in the flow direction of an operating medium 113 in the hot-gas duct 111, a row of vanes 115 is followed by a row of rotor blades 125 formed from rotor blades 120.

The vanes 130 here are fastened to a gas turbine housing 138 of a stator 143, whereas the rotor blades 120 of a row of rotor blades 125 are attached to the rotor 103, for example by means of a turbine disk 133.

A generator 5 (FIG. 24) or a work machine (not illustrated) is coupled to the rotor 103.

During the operation of the gas turbine 100, air 135 is suctioned through the intake housing 104 and compressed by the compressor 105. The compressed air provided at the turbine-side end of the compressor 105 is guided to the burners 107 in a combustion chamber 110 and therein mixed with a fuel. The mixture in the combustion chamber 110 is then combusted while forming the operating medium 113. From there, the operating medium 113 flows along the hot-gas duct 111, passing the vanes 130 and the rotor blades 120. The operating medium 113 relaxes on the rotor blades 120 so as to transmit an impulse such that the rotor blades 120 drive the rotor 103, the latter in turn driving the work machine coupled thereto.

The components exposed to the hot operating medium 113 are subjected to thermal stress during the operation of the gas turbine 100. The vanes 130 and the rotor blades 120 of the turbine stage 112, the latter when viewed in the flow direction of the operating medium 113 being the first turbine stage 112, are thermally stressed to the highest extent, apart from the heat shield elements which clad the combustion chamber 110.

In order to withstand the temperatures prevailing therein, these vanes 130 and rotor blades 120 can be cooled by means of a coolant.

Likewise, substrates of the components may have an oriented structure, i.e. said substrates are monocrystalline (SX structure) or have only longitudinally oriented grains (DS structure). Superalloys based on iron, nickel or cobalt are used as a material for the components, in particular for the turbine blades 120, 130 and the components of the combustion chamber 110, for example.

Such superalloys are advantageously known from EP 1 204 776 B1, EP 1 306 454, EP 1 319 729 A1, WO 99/67435, or WO 00/44949, or are set forth in FIG. 4, respectively.

Likewise, the blades 120, 130 may have anti-corrosion coatings: MCrAlX; M is at least one element from the group comprising cobalt (Co), nickel (Ni); X is an active element and represents yttrium (Y) and/or tantalum (Ta), and/or at least one rare earth element or hafnium (Hf) or iron (Fe). Such alloys are known from EP 0 486 489 B1, EP 0 786 017 B1, EP 0 412 397 B1, or EP 1 306 454 A1.

A thermal insulation layer may also be present on the MCrAlX, the former being composed of, for example, $ZrO_2$, $Y_2O_3$-$ZrO_2$, i.e. said thermal insulation is not, partially or completely stabilized by yttrium oxide and/or calcium oxide and/or magnesium oxide and/or erbium oxide and/or ytterbium oxide.

The vane 130 has a vane root (not illustrated here) that faces the gas turbine housing 138 of the turbine 108, and a vane head that is opposite the vane root. The vane head faces the rotor 103 and is established on a fastening ring 140 of the stator 143.

Figure 2:
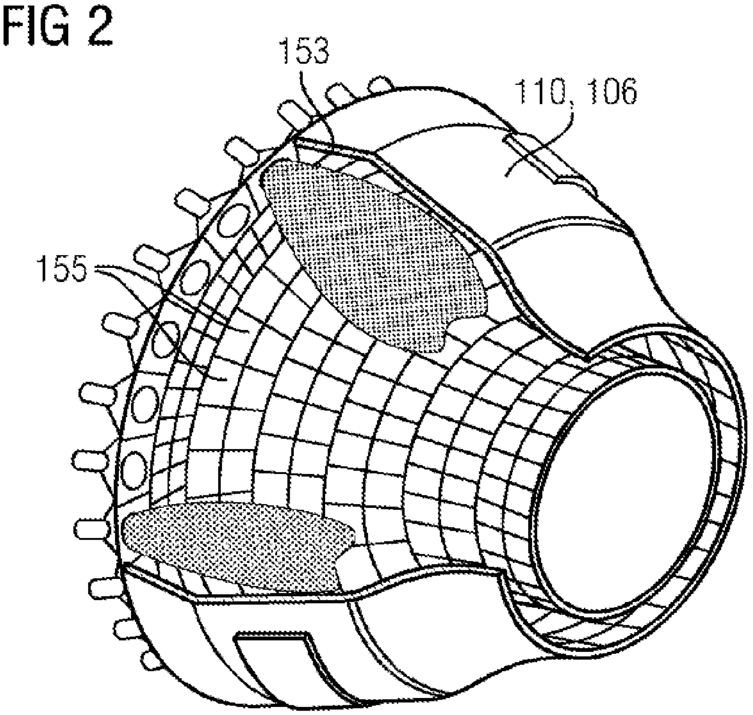
FIG. 2 shows a combustion chamber.

FIG. 2 shows a combustion chamber 110 of a gas turbine. The combustion chamber 110 is designed as a so-called annular combustion chamber, for example, in which a multiplicity of burners 107 disposed in the circumferential direction about a rotation axis 102 open into a common combustion chamber 110 and generates flames 156. To this end, the combustion chamber 110 in its entirety is designed as an annular structure which is positioned about the rotation axis 102.

In order to achieve a comparatively high rate of efficiency, the combustion chamber 110 is conceived for a comparatively high temperature of an operating medium, said temperature being approximately 1273 K to 1873 K. In order to achieve a comparatively long operating time even at these operating parameters which are unfavorable for the materials, the combustion chamber wall 153 of the combustion chamber 110, on that side thereof that faces the operating medium, is provided with an interior cladding formed by heat shield elements 155. Each heat shield element 155 is made from an alloy and on the side that faces the operating medium is equipped with a particularly heat resistant protective layer (MCrAlX layer and/or a ceramic coating) or is made from a material resistant to high temperatures (solid ceramic bricks).

These protective layers of the metallic heat shield elements 155 can be similar to those of the turbine blades, MCrAlX thus meaning, for example: M is at least one element of the group comprising iron (Fe), cobalt (Co), nickel (Ni); X is an active element and represents yttrium (Y) and/or silicon (Si) and/or tantalum (Ta) and/or at least one rare earth element or hafnium (Hf) and/or iron (Fe). Such alloys are known from EP 0 486 489 B1, EP 0 786 017 B1, EP 0 412 397 B1, or EP 1 306 454 A1.

A ceramic thermal insulation layer may also be present on the MCrAlX, the former being composed of, for example, $ZrO_2$, $Y_2O_3$-$ZrO_2$, i.e. said thermal insulation is not, partially or completely stabilized by yttrium oxide and/or erbium oxide, ytterbium oxide and/or hafnium oxide.

Many coating methods are conceivable, for example atmospheric plasma spraying (APS), LPPS, VPS or CVD. For improved resistance to thermal shock, the thermal insulation layer can have porous grains or grains with micro-fissures or macro-fissures.

Refurbishment means that heat shield elements 155 after the use thereof optionally have to be relieved of protective layers (for example by sandblasting). The removal of the anti-corrosion and/or anti-oxidation layers or products, respectively, takes place thereafter. Cracks in the heat shield element 155 are optionally also repaired. Re-coating of the heat shield elements 155 takes place thereafter, and the heat shield elements 155 are reused.

By virtue of the high temperatures in the interior of the combustion chamber 110, a cooling system can moreover be provided for the heat shield elements 155, or for the holding elements of the latter, respectively. The heat shield elements 155 in this instance are hollow, for example, and optionally have cooling bores that open into the combustion chamber space 154 (not illustrated).

Figure 3:
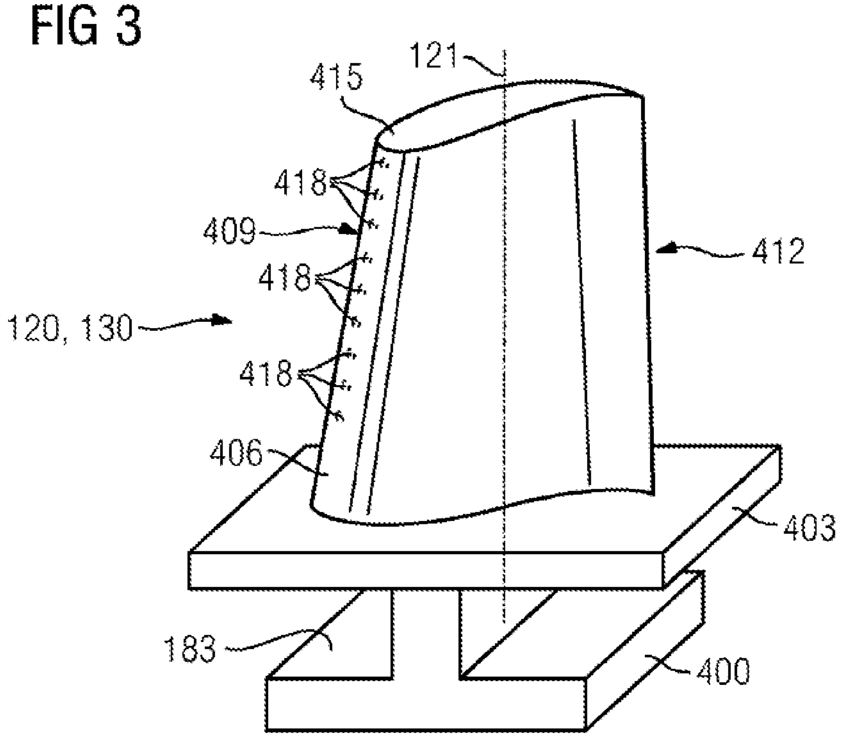
FIG. 3 shows a turbine vane.

FIG. 3 in a perspective view shows a rotor blade 120 or vane 130 of a turbomachine that extends along a longitudinal axis 121.

The turbomachine can be a gas turbine of an aircraft or of a power station for generating electricity, a steam turbine or a compressor.

The blade 120, 130, sequentially along the longitudinal axis thereof, has a fastening region 400, adjacent thereto a blade platform 403, as well as a turbine blade 406, and a blade tip 415.

As a vane 130, said blade 120 can have a further platform on the blade tip 415 of said vane 130 (not illustrated).

A blade root 183, which serves for fastening the rotor blades 120, 130 to a shaft or a turbine disk 133 is formed in the fastening region 400 (FIG. 1).

The blade root 183 is designed as a hammer head, for example. Other designs as a fir-tree or a dovetail root are possible.

The blade 120, 130 for a medium that flows past the turbine blade 406 has an inlet edge 409 and an outlet edge 412.

For example, in conventional blades 120, 130, solid metallic materials, in particular superalloys, are used in all regions 400, 403, 406 of the blade 120, 130.

Such superalloys are advantageously known from EP 1 204 776 B1, EP 1 306 454, EP 1 319 729 A1, WO 99/67435, or WO 00/44949, or are set forth in FIG. 4, respectively.

The blade 120, 130 here can be made by a casting method, also by means of oriented solidification, by a forging method, by a milling method, or combinations thereof.

Workpieces having a monocrystalline structure or structures are used as components for machines that in operation are exposed to high mechanical, thermal and/or chemical stress.

The manufacturing of monocrystalline workpieces of this type takes place by way of oriented solidification from the melt, for example. This here is a casting method in which the liquid metallic alloy solidifies so as to form the monocrystalline structure, i.e. the monocrystalline workpiece, or solidifies in an oriented manner.

Dendritic crystals here are oriented along the thermal flow and form either a columnar crystalline grain structure and thus grains which run across the entire length of the workpiece and here, following the general terminology, are referred to as solidified in an oriented manner, or a monocrystalline structure, i.e. the entire workpiece is composed of a single crystal. In these methods, the transition to the equiaxed (polycrystalline) solidification has to be avoided because transversal and longitudinal grain boundaries which destroy the positive properties of the oriented-solidification or monocrystalline component are configured by necessity as a result of the non-oriented growth. When reference is made generally to structures which are solidified in an oriented manner, this thus also refers to monocrystals which have no grain boundaries or at most small-angle grain boundaries, as well as to columnar crystalline structures which indeed have grain boundaries running in the longitudinal direction but do not have any transversal grain boundaries. In the case of these second crystalline structures mentioned, reference is also made to directionally solidified structures.

Such methods are known from U.S. Pat. No. 6,024,792 and EP 0 892 090 A1.

Likewise, the blades 120, 130 may have anti-corrosion or anti-oxidation coatings: in particular MCrAlX; M is at least one element from the group comprising cobalt (Co) or nickel (Ni); X is an active element and represents yttrium (Y) and/or tantalum (Ta), and/or at least one rare earth element and/or hafnium (Hf) and/or iron (Fe). Such alloys are known from EP 0 486 489 B1, EP 0 786 017 B1, EP 0 412 397 B1, or EP 1 306 454 A1.

The density is advantageously 95% of the theoretical density.

A protective aluminum oxide layer (TGO=thermal grown oxide layer) is formed (as an intermediate layer or as the outermost layer) on the MCrAlX layer.

A thermal insulation layer may also be present on the MCrAlX, the former advantageously being the outermost layer and composed of, for example, $ZrO_2$, $Y_2O_3$-$ZrO_2$, i.e. said thermal insulation is not, partially or completely stabilized by yttrium oxide and/or calcium oxide and/or magnesium oxide and/or erbium oxide and/or ytterbium oxide.

The thermal insulation layer covers the entire MCrAlX layer.

Other coating methods are conceivable, for example atmospheric plasma spraying (APS), LPPS, VPS or CVD. For improved resistance to thermal shock, the thermal insulation layer can have porous grains or grains with micro-fissures or macro-fissures. The thermal insulation layer is thus advantageously more porous than the MCrAlX layer.

Refurbishment means that components 120, 130 after the use thereof optionally have to be relieved of protective layers (for example by sandblasting). The removal of the anti-corrosion and/or anti-oxidation layers or products, respectively, takes place thereafter. Cracks in the component 120, 130 are optionally also repaired. Re-coating of the component 120, 130 takes place thereafter, and the component 120, 130 is reused.

The blade 120, 130 can be embodied so as to be hollow or solid. When the blade 120, 130 is to be cooled, said blade 120, 130 is hollow and optionally also has cooling bores 418 (indicated by dashed lines).

Figure 24:
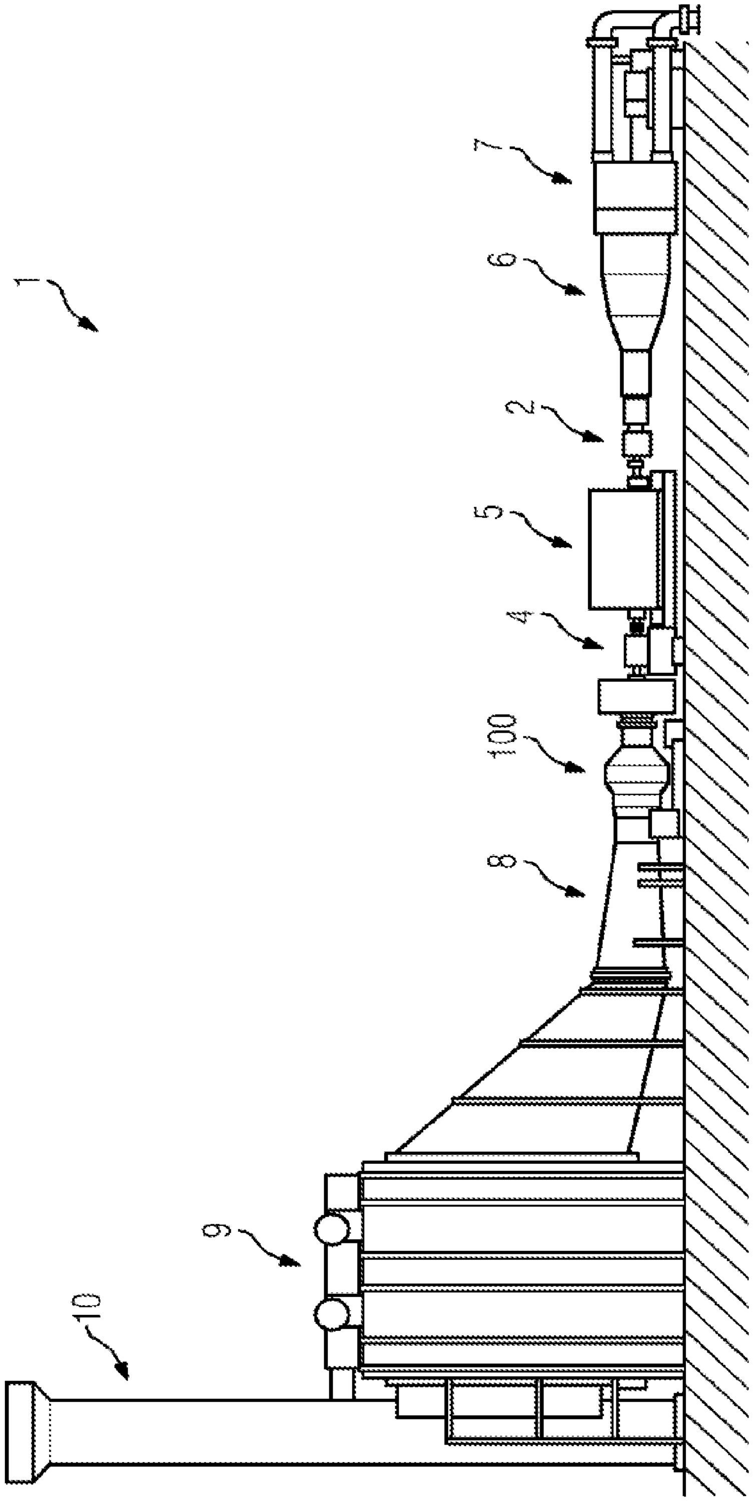
FIG. 24 shows an energy generation installation.

FIG. 24 in an exemplary manner shows an energy conversion installation 1 having an installation. This arrangement according to FIG. 24 can be present in multiples in an energy conversion installation, or be present in the latter in a modified form.

The gas turbine 100 by way of a transmission 4 or a clutch 4 is coupled to a generator 5 for generating electric power.

The generator 5 by way of a clutch 2 is likewise connected to a steam turbine 6.

Steam turbines 6 are present when this is a combined cycle installation. An energy conversion installation 1 can also have only a gas turbine 100 without steam turbine 6.

If and when present, a condenser 7 is connected to the steam turbine 6. The exhaust gas from the gas turbine 100 by way of a diffuser 8 flows into a heat recovery installation 9 in which the hot exhaust air is used for generating steam.

An exhaust air chimney 10 is likewise present.

The concept lies in carrying out servicing measures on an energy conversion installation, wherein the energy conversion installation has at least the following machines: at least one gas turbine; at least one generator; and optionally at least one steam turbine; wherein repairs are carried out on the at least one machine, in particular a defective component or defective components of the at least one machine either is/are or will be replaced by a new, identical component or new, identical components and/or repaired; and wherein, while carrying out these repairs, further measures for extending the service life of machines or the components thereof and/or further measures for optimizing (the efficiency) of machines or the components thereof are carried out.

In particular, the defective components comprise turbine blades or the coatings thereof; and/or burners or burner components; and/or compressor blades or the coatings thereof; and/or combustion chamber bricks.

The defective components can advantageously comprise only turbine blades.

The defective components can advantageously comprise only turbine blades or the coatings thereof as well as burners or burner components.

As further measures only measures for extending the service life are advantageously carried out.

As further measures only measures for optimizing are advantageously carried out.

As further measures, measures for extending the service life of components and measures for optimizing components can likewise be carried out.

In the case of the servicing measures, advantageously at least one measure, in particular at least two identical, or at least two different, measures for extending the operating life of machines or the components thereof, selected from the group comprising: bearing of the rotor, burner, compressor blade, compressor housing, turbine blades, gas turbine housing, blade carrier, heat shields or combustion chamber bricks, seals, transition combustion chamber to turbine, cooling and/or monitoring apparatuses, is/are carried out.

In the case of the servicing measures, advantageously at least one measure, in particular at least two identical, or at least two different, measures for optimizing machines or the components thereof, selected from the group comprising: increased efficiency, improved cooling, burner, compressor blade, compressor housing, turbine blades, gas turbine housing, blade carrier, heat shields or combustion chamber bricks, seals and/or transition combustion chamber to turbine, is/are carried out.

The individual measures are described in more detail hereunder, said measures being able to be combined in an arbitrary manner with one another, depending on the requirement:

Method for modifying a gas turbine machine which has at least: a compressor; a combustion chamber; a hot-gas duct having a bladed rotor; and at least one rotor bearing of the rotor which, when viewed in a flow direction of the gas turbine machine, is at the beginning of the compressor; wherein the rotor bearing is replaced; wherein the new rotor bearing is at least 5% longer; or a new rotor bearing of at least 370 mm in length is installed, in particular wherein the new rotor bearing is at most 500 mm in length.

Method for modifying a gas turbine machine which has at least: a compressor; a combustion chamber; a hot-gas duct having a bladed rotor; at least one burner for the combustion chamber, in which the fuel-supplying means, in particular pipes, are at least partially, in particular completely, provided on the inside with the diffusion coating, in particular calorized; or the fuel-supplying means, in particular pipes having a diffusion coating on the inside, in particular calorized on the inside, are installed.

Method for modifying a gas turbine machine which has at least: a compressor; a combustion chamber; a hot-gas duct having a bladed rotor; wherein the compressor has a compression housing which is or will be configured in two parts, and in particular in which an internal compressor housing as a blade carrier made from a first material, in particular made from steel, is installed, most particularly made from cast steel, is installed, and the external compressor housing as a blade carrier comprises a second material distinctly different from the first material, in particular gray cast iron; or in which the internal compressor housing comprises gray cast iron or is replaced by gray cast iron.

Method for modifying a gas turbine machine which has at least: a compressor; a combustion chamber; a hot-gas duct having a bladed rotor; having stages (I, II, III, IV) of rotor blades and vanes; wherein rotor blades and vanes resistant to higher temperatures and with improved cooling are installed, in particular in stages (I, II); or in which the rotor blades or vanes in the hot-gas duct have a directionally solidified microstructure in the form of a columnar solidified microstructure, in particular only the two first stages (I, II), most particularly only the first stage (I); or in which a segmented ceramic layer based on yttrium-stabilized zirconium oxide (HGB) is present on or applied to the rotor blades and vanes; or in which the rotor blades and vanes for the metallic substrate have a monocrystalline microstructure, or such rotor blades and vanes are installed, in particular only the first two stages (I, II); or in which the ceramic coating comprises partially stabilized yttrium-stabilized zirconium oxide, having a porosity of 12±4%; or having a TBC without segmentation on the vanes or rotor blades; or in which a blade tip in a depression has a step-shaped shoulder which directly adjoins a web of the intake side, and thus represents additional material in the depression; wherein a cooling air bore for improved cooling of the blade tip runs from the interior of the rotor blade through the shoulder.

Method for modifying a gas turbine machine which has at least: a compressor; a combustion chamber; a hot-gas duct having a bladed rotor; having stages (I, II, III, IV) of rotor blades and vanes; in which the rotor blades and vanes, in particular in stages (I, II), that have cooling bores on the lateral faces of the blade platforms are installed.

Method for modifying a gas turbine machine which has at least: a compressor; a combustion chamber; a hot-gas duct having a bladed rotor; having stages (I, II, III, IV) of rotor blades and vanes, wherein rotor blades are installed; wherein the blade tip of the rotor blades, in particular of stages (I, II), is cooled, in particular by cooling bores in the blade tip.

Method for modifying a gas turbine machine which has at least: a compressor; a combustion chamber; a hot-gas duct having a bladed rotor; having stages (I, II, III, IV) of rotor blades and vanes; wherein rotor blades of stage (IV) that are not cooled are installed, in particular the vanes of stage (III) are also not cooled.

Method for modifying a gas turbine machine having at least: a compressor; a combustion chamber; a hot-gas duct having a bladed rotor; in which gas turbine machine, when viewed in the flow direction, a front plenum and a rear plenum are present outside the hot-gas duct, said front plenum and rear plenum for technical reasons having different pressures; wherein the front plenum in the flow direction is present behind the rotor blade of stage (III) and above the vane of stage (IV); and either ducts which were present in the center of stage (IV), between the rotor blade and the vane, and previously used for cooling the turbine vanes and rotor blades of stage (IV) or for supplying cooling air, are closed, and a new long duct from the rear plenum is retroactively incorporated in the blade carrier; or a new blade carrier is provided and installed, said new blade carrier now having only one such duct.

Method for modifying a gas turbine machine which has at least: a compressor; a combustion chamber having combustion chamber bricks or heat shields; a hot-gas duct having a bladed rotor; wherein a gap between a heat shield and a vane of stage (I) of the motor a radius on the flow-side end of the heat shield and the opposite radius of the vane of stage (I) is identically embodied, so as to avoid a projection or an undercut in the heat shield, in which dirt could accumulate or erosion occurs.

Method for modifying a gas turbine machine having at least: a compressor; a combustion chamber; a hot-gas duct having a bladed rotor; wherein a vane carrier having a seal assembly made from elements is installed or modified, said seal assembly leading to a reduced consumption of cooling air; wherein the individual elements of the vane carrier have a gap, said gap being configured as a labyrinth or in an S-shaped manner; wherein the front element in the flow direction has a first cam, and the second rear element in the flow direction has a second cam configured above the first cam such that an S-shaped gap is formed, as a result of which the opening of the gap, when viewed in the flow direction, lies at the rear of the hot-gas duct.

Method for modifying a gas turbine machine which has at least: a compressor; a combustion chamber having heat shields or combustion chamber bricks; a hot-gas duct having a bladed rotor; wherein combustion chamber bricks are installed, said combustion chamber bricks being configured so as to generate a spoiler effect.

Method for modifying a gas turbine machine which has at least: a compressor; a combustion chamber having combustion chamber bricks; a hot-gas duct having a rotor; wherein combustion chamber bricks are installed that on two opposite lateral faces of the combustion chamber brick receive two mutually separated depressions which serve for the combustion chamber brick to be mechanically engaged from the rear side.

Method for modifying a gas turbine machine which has at least: a compressor; a combustion chamber having combustion chamber bricks; a hot-gas duct having a bladed rotor; a housing part for the hot-gas duct; wherein a depression for a seal is placed in the contact face and the housing is closed again.

Method for modifying a gas turbine machine which has at least: a compressor; a combustion chamber having combustion chamber bricks and burners; a hot-gas duct having a rotor; wherein modified vanes are installed in the swirler of the burner, said modified vanes having a smaller opening angle in comparison to the previous vanes; and an outlet edge being rotated in relation to the longitudinal axis of the blade.

Method for modifying a gas turbine machine which has at least: a compressor; a combustion chamber; a hot-gas duct having a bladed rotor; wherein a system for monitoring the combustion dynamic and combustion accelerations of the combustion chamber and burners is retrofitted so as to reduce or avoid combustion instabilities.

Method for modifying a steam turbine which is directly connected to a gas turbine; wherein the steam turbine has turbine blades; wherein the turbine blades have a root having depressions; wherein the depressions have a larger radius in comparison to the previously installed turbine blades to be replaced.

The following machine types are advantageously achieved therewith:

Gas turbine machine having at least: a compressor; a combustion chamber; a hot-gas duct having a bladed rotor; and at least one rotor bearing of the rotor which, when viewed in a flow direction of the gas turbine machine, is at the beginning of the compressor; wherein the rotor bearing is at least 370 mm in length; in particular is at most 500 mm in length.

Gas turbine machine having at least: a compressor; a combustion chamber; a hot-gas duct having a bladed rotor; at least one burner for the combustion chamber, in which the fuel-supplying means, in particular pipes at least partially, in particular completely, have on the inside a diffusion coating, in particular are calorized.

Gas turbine machine having at least: a compressor; a combustion chamber; a hot-gas duct having a bladed rotor; wherein the compressor has a compressor housing which is configured in two parts and has an internal compressor housing as a blade carrier, which comprises a first material, in particular steel, most particularly cast steel; and an external compressor housing as a blade carrier comprises a second material distinctly different from the first material, in particular gray cast iron; or in which the internal compressor housing as a blade carrier comprises gray cast iron or is replaced by gray cast iron.

Gas turbine machine having at least: a compressor; a combustion chamber; a hot-gas duct having a bladed rotor; having stages (I, II, III, IV) of rotor blades and vanes; wherein the turbine blades and vanes, in particular of stages (I, II), are resistant to higher temperatures, in particular have improved cooling; or in which the rotor blades or vanes in the hot-gas duct have a directionally solidified microstructure, in the form of a columnar solidified microstructure, in particular only the two first stages (I, II), most particularly only the first stage (I); or in which a segmented ceramic layer based on yttrium-stabilized zirconium oxide is present on or applied to the rotor blades and vanes; or in which the rotor blades and vanes for the metallic substrate have a monocrystalline microstructure, or such rotor blades and vanes are installed, in particular only the first two stages (I, II); or in which the ceramic coating comprises partially stabilized yttrium-stabilized zirconium oxide, having a porosity of 12±4%; or having a TBC without segmentation on the vanes or rotor blades; or in which a blade tip in a depression has a step-shaped shoulder which directly adjoins a web of the intake side and thus represents additional material in the depression; wherein a cooling air bore for improved cooling of the blade tip runs from the interior of the rotor blade through the shoulder.

Gas turbine machine having at least: a compressor; a combustion chamber; a hot-gas duct having a bladed rotor; having stages (I, II, III, IV) of rotor blades and vanes; in which the rotor blades and vanes, in particular of stages (I, II), have cooling bores on the lateral faces of the blade platforms.

Gas turbine machine having at least: a compressor; a combustion chamber; a hot-gas duct having a bladed rotor; having stages (I, II, III, IV) of rotor blades and vanes; wherein the blade tip, in particular of stages (I, II), is cooled, in particular by cooling bores in the blade tip.

Gas turbine machine having at least: a compressor; a combustion chamber; a hot-gas duct having a bladed rotor; having stages (I, II, III, IV) of rotor blades and vanes; wherein the rotor blade of stage (IV) does not have to be cooled, in particular the vane of stage (III) is not cooled.

Gas turbine machine having at least: a compressor; a combustion chamber; a hot-gas duct having a bladed rotor; in which, when viewed in the flow direction, a front plenum and a rear plenum are present outside the hot-gas duct; said front plenum and rear plenum for technical reasons having different pressures; wherein the front plenum in the flow direction is present behind the rotor blade of stage (III) and above the vane of stage (IV); and a long duct from the rear plenum is present in the blade carrier; said long duct cooling the stage (III) from the rear plenum.

Gas turbine machine having at least: a compressor; a combustion chamber having combustion chamber bricks or heat shields; a hot-gas duct having a bladed rotor; having a gap between a heat shield and a vane of stage (I) of the rotor; wherein a radius on the flow-side end of the heat shield and the opposite radius of the vane of stage (I) are identically embodied, so as to avoid a projection or an undercut in the heat shield, in which dirt could accumulate or erosion occurs.

Gas turbine machine having at least: a compressor; a combustion chamber; a hot-gas duct having a bladed rotor; a vane carrier having a seal assembly made from elements, said seal assembly leading to a reduced consumption of cooling air; wherein the individual elements of the vane carrier have a gap, said gap being configured as a labyrinth or in an S-shaped manner; wherein the front element in the flow direction has a first cam, and the second rear element in the flow direction has a second cam configured above the first cam such that an S-shaped gap is formed; as a result of which the opening of the gap, when viewed in the flow direction, lies at the rear of the hot-gas duct.

Gas turbine machine having at least: a compressor; a combustion chamber having heat shields or combustion chamber bricks; a hot-gas duct having a bladed rotor; wherein the combustion chamber at the flow-side end of the heat shields or combustion chamber bricks is configured such that said heat shields or combustion chamber bricks generate a spoiler effect.

Gas turbine machine having at least: a compressor; a combustion chamber having combustion chamber bricks; a hot-gas duct having a bladed rotor; wherein two mutually separated depressions are configured on two opposite lateral faces of the combustion chamber brick, said depressions serving for the combustion chamber brick to be mechanically engaged from the rear side.

Gas turbine machine having at least: a compressor; a combustion chamber having combustion chamber bricks; a hot-gas duct having a bladed rotor; an upper and a lower housing part for the hot-gas duct; wherein housing parts on the contact face, in particular in the region of the vane depressions, have a depression having a seal.

Gas turbine machine having at least: a compressor; a combustion chamber having combustion chamber bricks; a hot-gas duct having a bladed rotor; wherein the combustion chamber is disposed a burner, said burner having a swirler having vanes; wherein the opening angle of the vane is reduced and the blade of the vane is along the outlet edge of the blade.

Gas turbine machine having at least: a compressor; a combustion chamber; a hot-gas duct having a bladed rotor; wherein a system which monitors the combustion dynamic and accelerations emanating from the combustion and the combustion chamber is installed.

Gas turbine machine in a combined cycle installation, having at least: a compressor; a combustion chamber; a hot-gas duct; having a bladed rotor; and a steam turbine; wherein an exhaust gas of the gas turbine machine is used indirectly for generating steam in a steam turbine; wherein the steam turbine has blades having a blade root; wherein the depressions have a larger radius.

These measures or models, respectively, will be explained in more detail by means of drawings and classified in terms of the intentions of said measures or models, respectively.

Service Life

Figure 5:
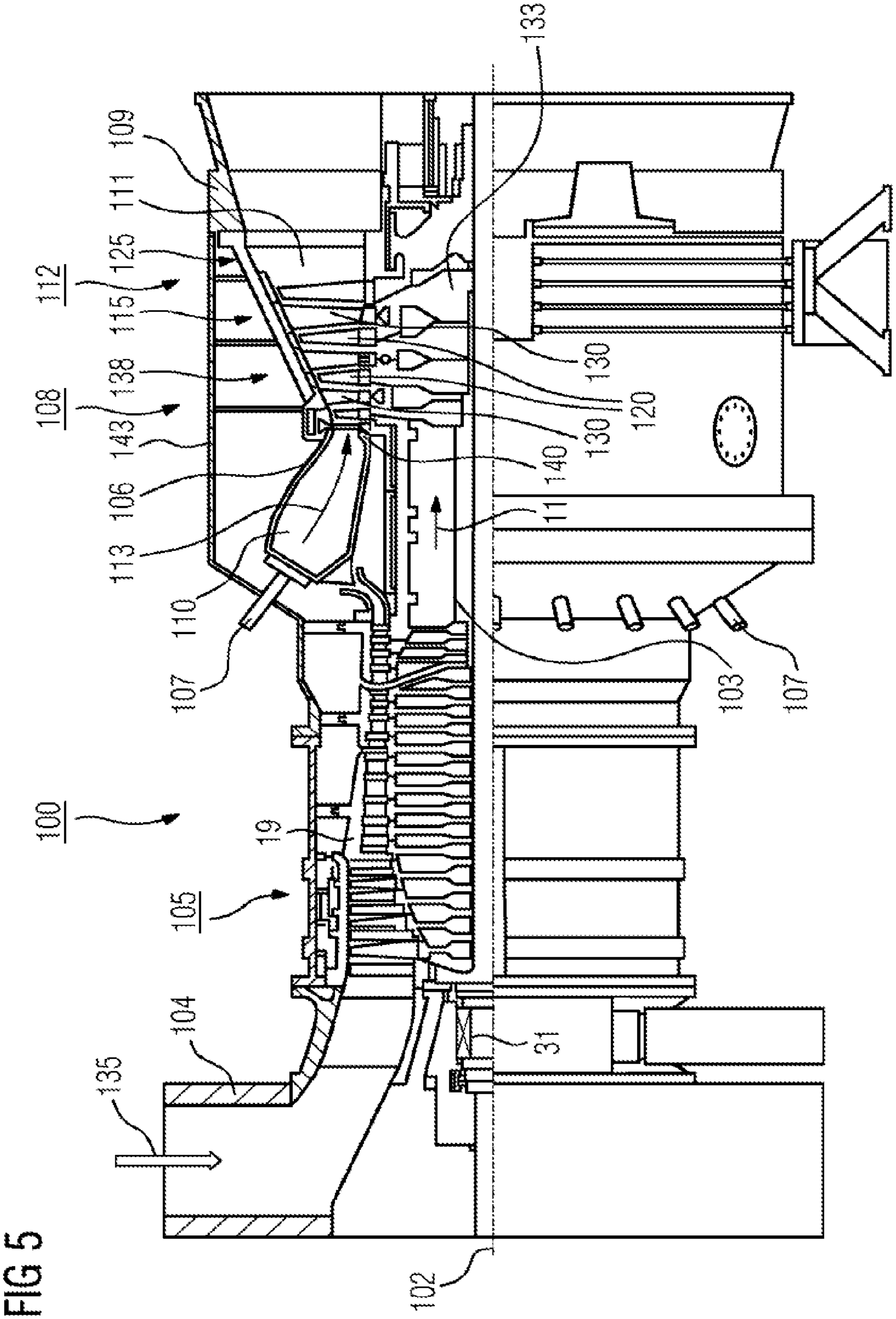
FIG. 5 shows a gas turbine having an improved bearing, in the cross section.

FIG. 5, like FIG. 1, shows a gas turbine machine 100 having the compressor 105 and the rotor 103 in the cross section. In the intake housing 104, air 135 is pumped into the compressor 105, the latter having a compressor housing 19.

For a longer service life of the gas turbine machine 100, the rotor bearing 31 of the rotor 103, in the flow direction 11 of the gas turbine machine 100, at the beginning of the compressor 105 and close to the intake housing 104 however has a length of at least 370 mm, and in particular a length of at most 500 mm, or in the event of an upgrade or revision is designed so as to be at least 5% longer so as to achieve less contact pressure per unit area.

In the event of a service, or at one of the next service intervals, the installed bearing does not have to be replaced, or never be replaced at all, or said bearing can be utilized until the end of the life of the gas turbine machine 100.

Likewise, said bearing can be replaced in the context of a very large servicing measure when the replacement of a bearing constitutes only a minor temporal input and can in particular take place in parallel, or is even facilitated as a result of the latter, respectively. The same applies in an analogous manner to a bearing of the rotor 103 in the region of the exhaust gas housing 109 (FIG. 24).

Service Life

Figure 6:
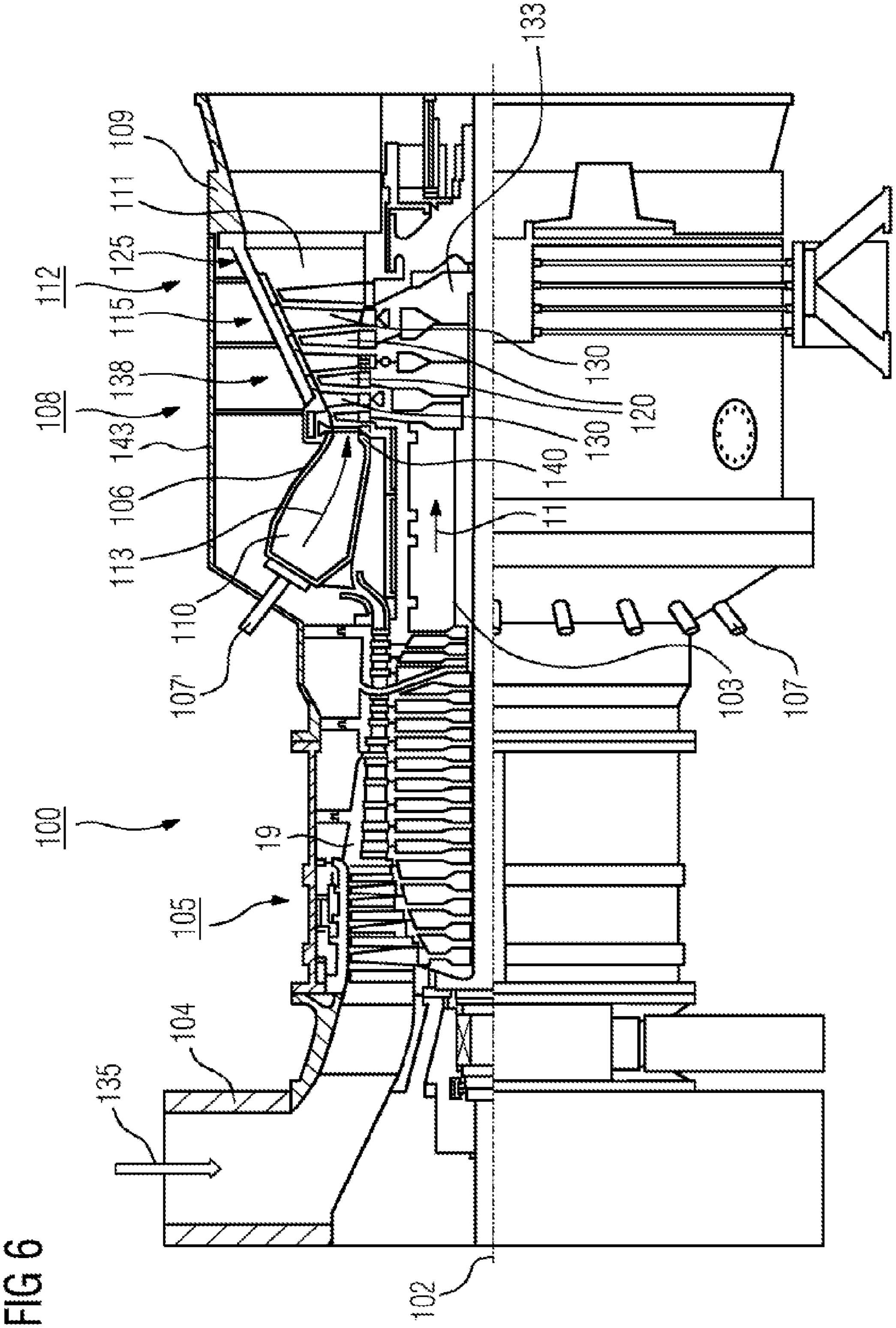
FIG. 6 shows a cross section of a gas turbine having improved burners.

The burner 107' of a gas turbine machine 100 in FIG. 6 is modified proceeding from FIG. 1, 5 or 7, 8, 12, or 14. The corrosive properties of the fuels such as, in particular of gas or oil, which is combusted may locally vary.

This likewise applies when petroleum or other fuels are used.

The burner system having the burner 107 (FIG. 1) is exposed to the highest temperatures.

For a longer service life, the fuel-supplying means such as pipes, in particular also of the burner 107', in particular of gas, are at least partially, in particular completely, provided on the inside with a diffusion coating, in particular calorized, that is to say that internal calorizing (or chrome plating, . . . ) is used in this instance.

The internal coating can also be carried out with the means in the installed state.

This increases the service life, or else the efficiency, by virtue of reduced corrosion.

The service life of the burner 107' can thus be individually adapted to the respective operating conditions.

Combustion chambers 110 refer to known systems such as annular combustion chambers or CANs.

Service Life/Efficiency

Figure 7:
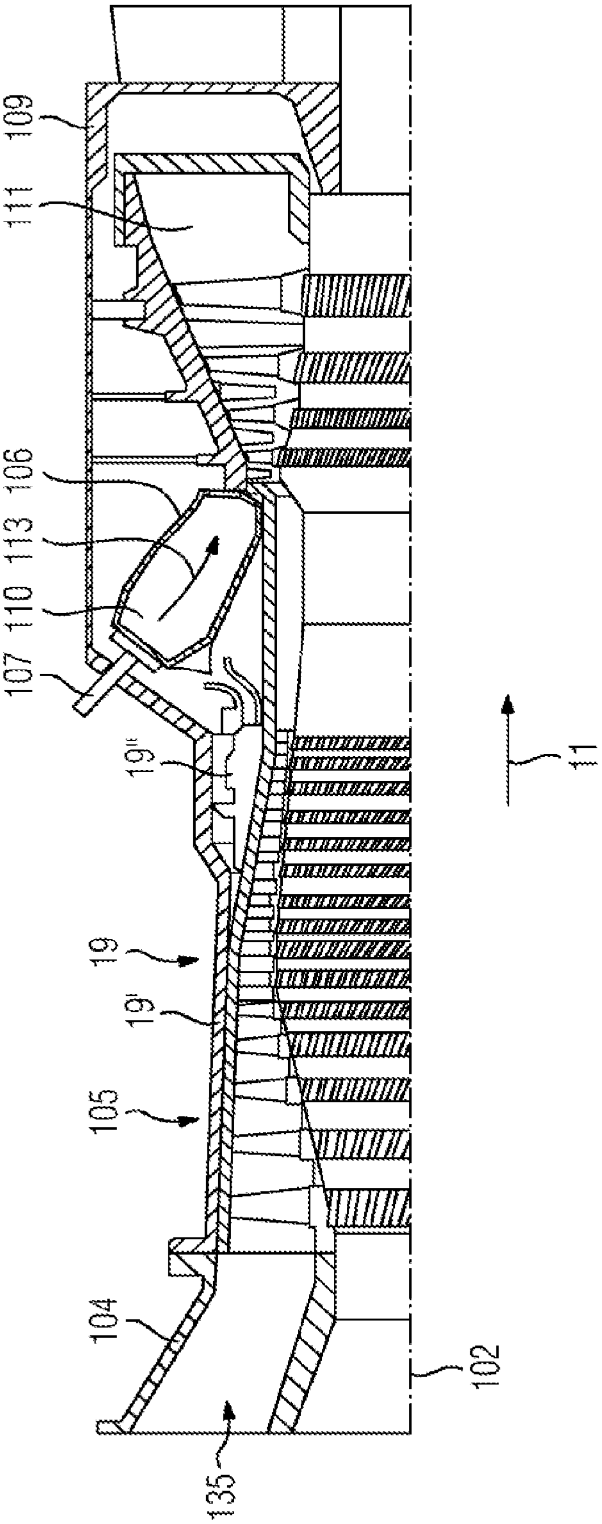
FIG. 7 shows a housing of a compressor with a gas turbine, in the cross section.

FIG. 7 shows an arrangement of a cross section of a gas turbine machine 100 similar to that according to FIG. 1, 5, 6, 8, 12, 14 or 24, but now having a compressor housing 19 which is in two parts and in the end region of the compressor 105 has an internal compressor housing 19" and an external compressor housing 19'.

The materials of the compressor housings 19', 19", in particular when the latter are in two parts, are typically made from the same first material, in particular from gray cast iron. With a view to an improved modification, the internal compressor housing 19" as a vane carrier is manufactured from a distinctly different second material, in particular from cast steel.

Different in the case of the first and the second material means that at least one alloy element in terms of the proportion by weight thereof differs by 10% and/or at least one further alloy element is present or absent and/or a different manufacturing method has been applied, or has a different, distinguishable microstructure.

Service Life/Efficiency

Figure 8:
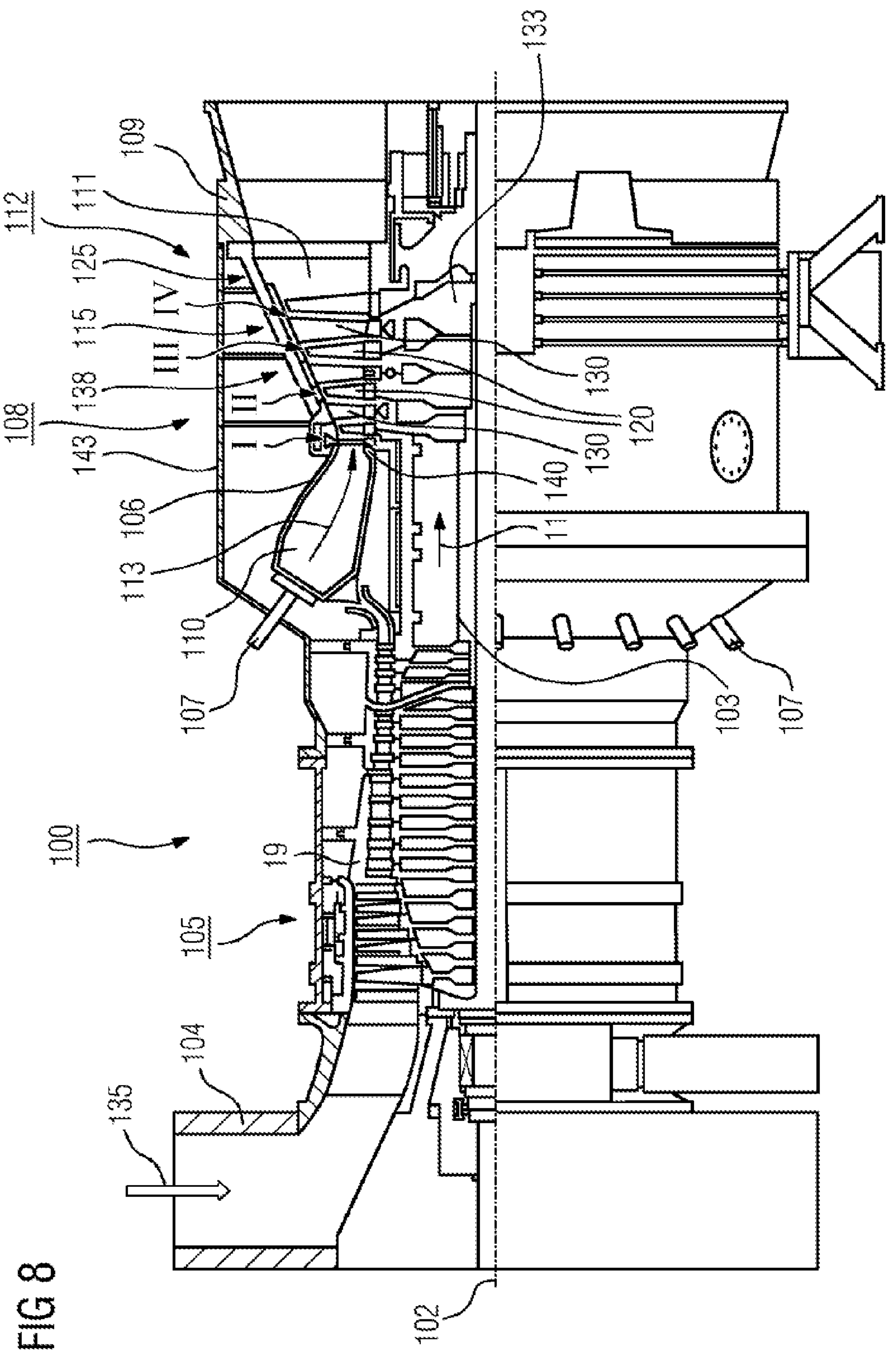
FIG. 8 shows a cross section of a gas turbine having in each case one vane region and one rotor blade region in the stages.

FIG. 8 shows in particular the hot-gas duct 111 having the stages I, II, III thereof, and in particular also stage IV.

In comparison to stages III and IV, stages I and II are exposed to the higher thermal stresses. Here, corresponding modifications of the substrate material, in particular in the form of directionally solidified alloys (SX, DS) or additional or improved cooling, respectively, in particular of the blade tip 415, are used.

Such a blade 120, 130 advantageously has a directionally solidified structure SX, DS in the form of a columnar solidified microstructure such as, in particular, alloys with the suffix DS in FIG. 4.

A further type of blade 120, 130 in the substrate comprises a monocrystalline microstructure such as an alloy with the suffix SX or CMSX . . . in FIG. 4. In particular, it is only the first stage I that comprises a DS structure, most particularly only the vane of stage I.

The blades 120, 130 have in particular cooling bores on the lateral faces of the blade platform 403, wherein the blade tips 415 are in particular also cooled.

A ceramic coating (TBC) based on partially stabilized YSZ (yttrium-stabilized zirconium oxide) has a porosity of 12±4%.

A further type of blade 120, 130 comprises a segmented TBC based on yttrium-stabilized zirconium oxide.

A further type of blade 120, 130 is composed of a directionally solidified structure DS in the substrate, i.e. in the form of a columnar microstructure and having a TBC based on YSZ without segmentation.

Service Life

Figure 9:
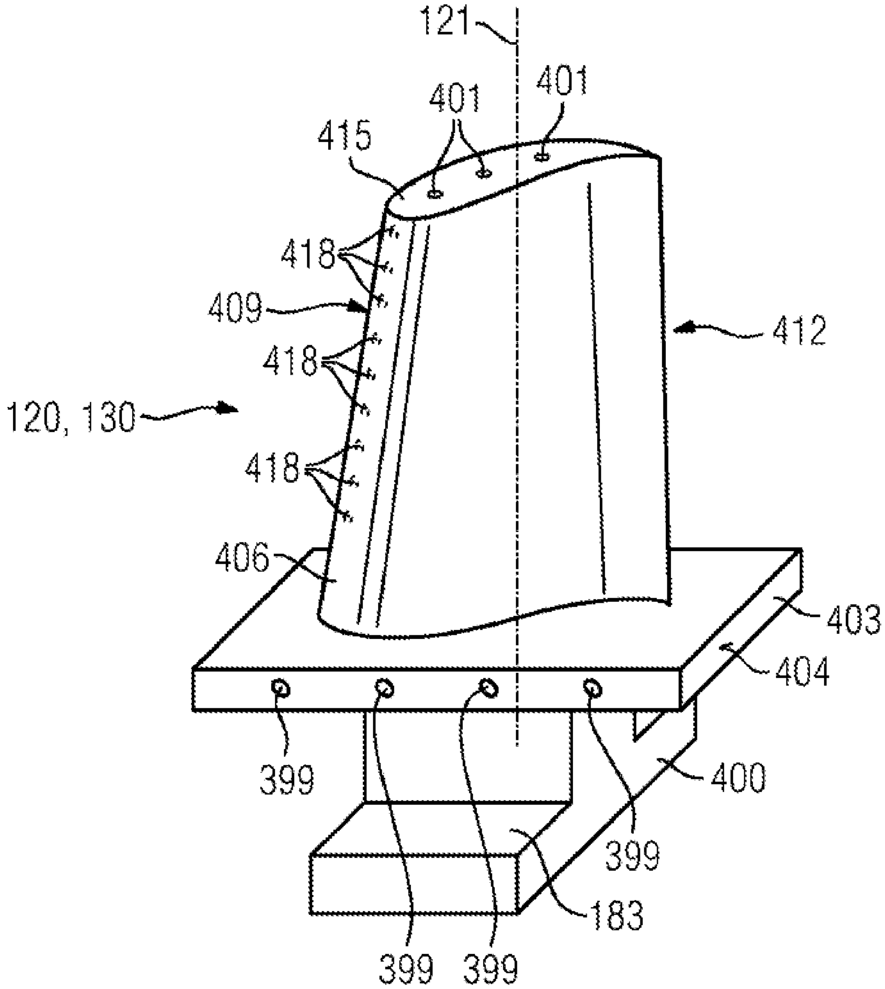
FIG. 9 shows a turbine blade having cooling bores on the lateral faces.

FIG. 9 shows a turbine blade 120, 130, in particular proceeding from FIG. 3, in which however cooling bores 399 are present on the lateral faces 404 of the blade platform 403. The cooling bores 399 on the lateral faces 404 can be present singularly or in multiples on one, two, three, or all four lateral faces 404, depending on the requirement. Optionally, cooling bores 405 can also be present on the blade tip 415 (only schematically illustrated). In a known manner, cooling air bores 418 are also present on the turbine blade 406.

The alignment and disposal of the cooling air bores 399, 405, 418 is only schematic. The cooling bores 399, 405, 418, 501 (FIG. 10) in relation to the lateral face 404 of the blade platform 403 can also run at an angle that differs from 90° and/or can have a diffusor.

As a result of cooling by cooling air that is retrieved from the compressor, the efficiency drops, the latter optionally being partially compensated for by the cooling effect.

Service Life

Figure 10:
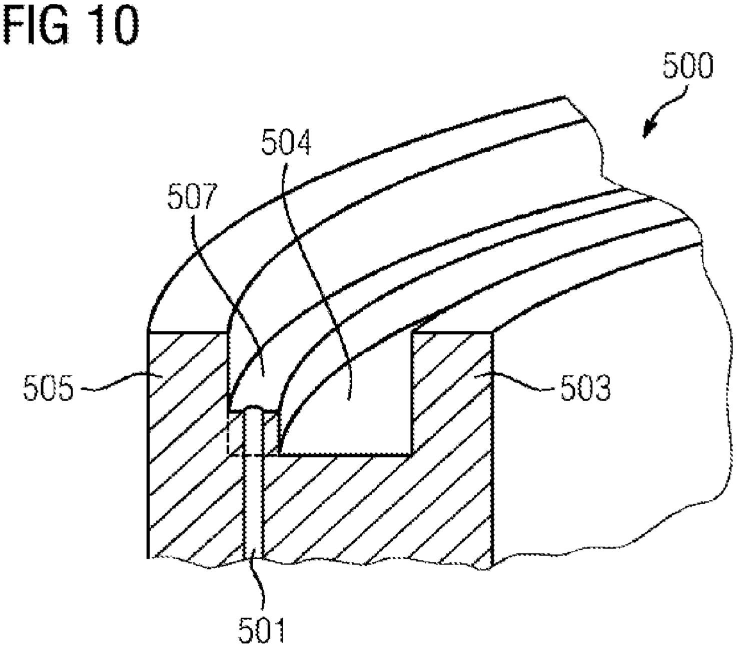
FIG. 10 shows a cooled tip of a turbine blade.

FIG. 10 shows a blade tip 415, 500 of a turbine rotor blade 120, in particular of stages I, II.

The blade tip 500 has two webs 503, 505 which run on the outside and, when viewed in the cross section, enclose a depression 504. The original depression 504 is indicated by dashed lines and is configured so as to be rectangular in the cross section.

According to the invention, the blade tip 500 in the depression 504 has a step-shaped shoulder 507 which directly adjoins the web 505 of the intake side and thus initially represents additional material in the depression 504. However, for improved cooling of the blade tip 500, a cooling air bore 501 from the interior of the rotor blade 120 now runs through the shoulder 507.

The cooling air bore 501 is advantageously aligned along the longitudinal axis 121 of the turbine blade 120.

Efficiency

Figure 11:
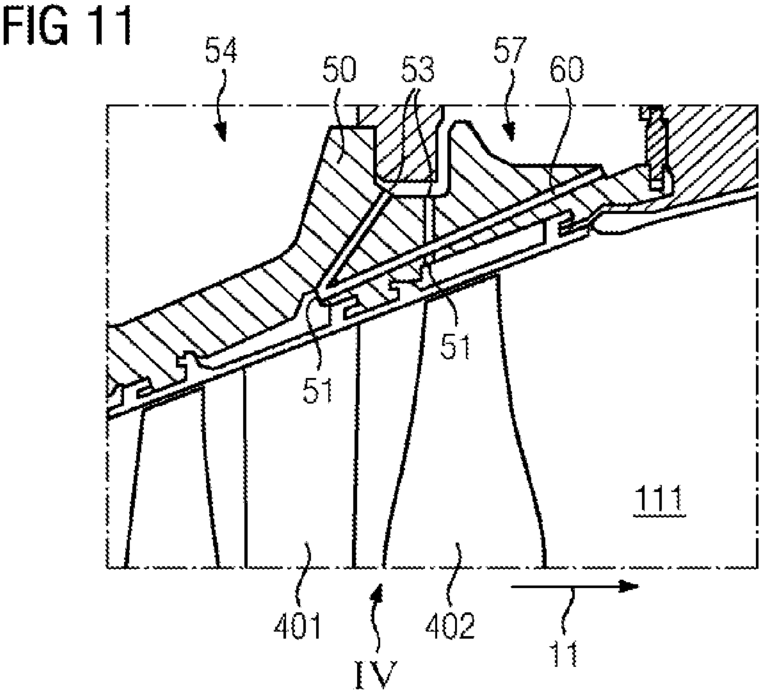
FIG. 11 shows a blade carrier of a rear turbine stage.

FIG. 11 shows a blade carrier 50 having a modified supply of cooling air.

The stage IV is fastened in the region of this blade carrier 50.

When viewed in the flow direction 11, there is a front plenum 54 and a rear plenum 57 outside the hot-gas duct 111, said plenums 54, 57 for technical reasons having different pressures. The front plenum 54, when viewed in the flow direction 11, is advantageously present behind the rotor blade of stage III and in the region above the vane IV.

Illustrated in the blade carrier 50 in FIG. 11 are two ducts 53 which in comparatively old models were used for cooling the turbine vanes and rotor blades of stage IV, or generally for supplying cooling air. The two ducts 53 were present in the region of stage IV, between the vane 401 and the rotor blade 402 of stage V, and ran so as to be almost perpendicular to the rotation axis 102 or at an acute angle to the latter. If and when present, these two ducts 53 are closed, and a new long duct 60, emanating from the rear plenum 57, is retroactively incorporated in the blade carrier 50, or a new blade carrier 50 which now only has one such duct 60 is provided. The duct 60 runs so as to be approximately parallel to the internal face of the hot-gas duct 111.

By virtue of the lower pressure, less cooling air is supplied to the vane 401. The supply of the new duct 60 in the axial flow direction through the gas turbine lies behind the rotor blade 402 and not between the vane and the rotor blade of stage IV. Less cooling air is consumed, this leading to a higher rate of efficiency.

Service Life/Efficiency

Figure 12:
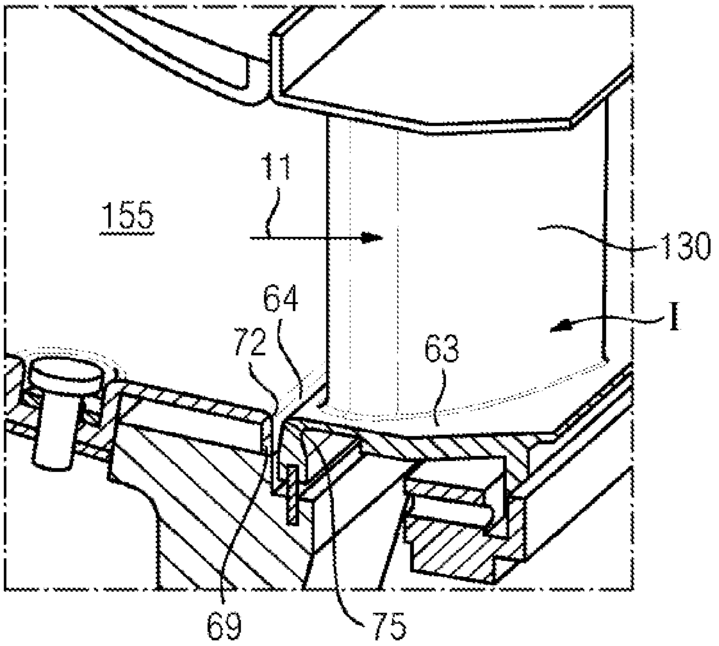
FIG. 12 shows a transition from a combustion chamber brick to vane.

FIG. 12 shows a transition from a last heat shield 155, or combustion chamber brick 155 of the combustion chamber 110, to a vane 130 of stage I. It can be seen that a gap 64 is present between the heat shield 155 and the vane 130.

The radius 72 on the flow-side end of the heat shield/combustion chamber brick 155 and the opposite radius 75 of the vane 130 of stage I are identically embodied. The intention is to avoid a projection or an undercut in the heat shield/combustion chamber brick 155, in which dirt could accumulate or erosion occurs.

Efficiency

Figure 13:
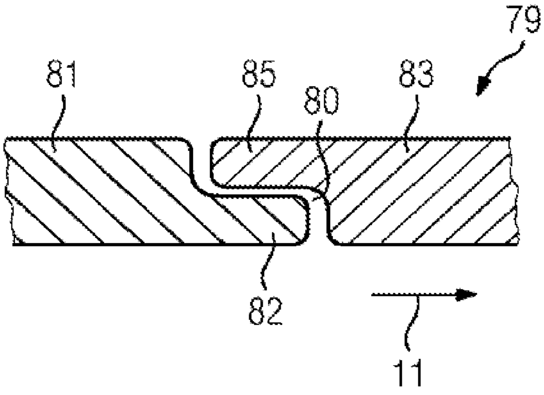
FIG. 13 shows a seal assembly of a vane carrier.

FIG. 13 shows a seal assembly 79 of a vane carrier 50 (FIG. 11), said seal assembly 79 leading to a lower consumption of cooling air.

The individual elements 81, 83 of the vane carrier 50 have a gap 80 which here is configured in the shape of a labyrinth or in an S-shaped manner. The lower consumption of cooling air is achieved in that the front element 81 in the flow direction 11 has a first cam 82, and the rear, second element 83 in the flow direction 11 has a second cam 85 configured above said first cam 82 such that an S-shaped gap 80 is configured and the cam 82 of the front element 81 forms part of the hot-gas duct 111.

When viewed in the flow direction, the opening of the gap thus lies at the rear of the hot-gas duct 111.

Efficiency

Figure 14:
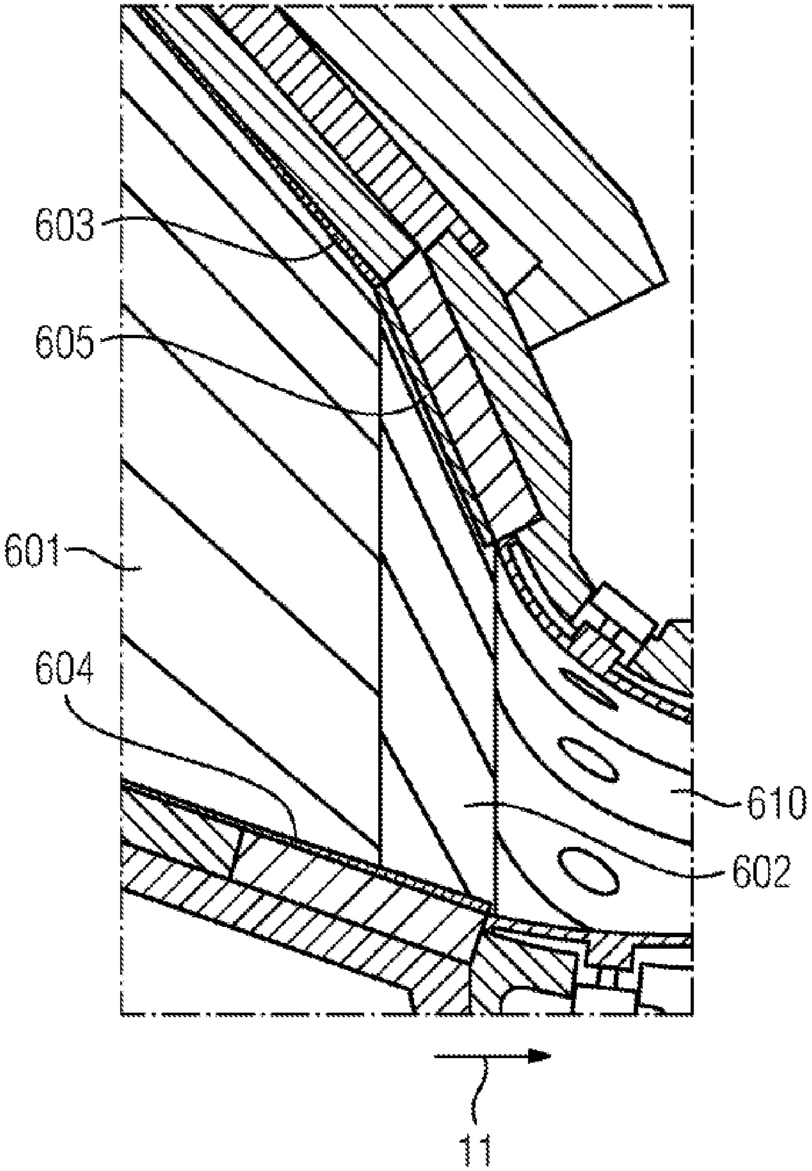
FIG. 14 shows combustion chamber bricks in a combustion chamber having a spoiler effect.

FIG. 14 shows a combustion chamber 110 having combustion chamber bricks 601, 604, 610 which lead to a spoiler effect.

The combustion chamber bricks 601, 602, or 603, 605, respectively, when viewed in the flow direction 11, are disposed in a row and in the circumferential direction.

When viewed in the flow direction 11, modified combustion chamber bricks 603, 605; 604 are present at the end, wherein further such combustion chamber bricks are disposed in the circumferential direction about the rotation axis 102.

The modified combustion chamber bricks 603, 604, 605, advantageously made completely from ceramic, when viewed in the flow direction 11, advantageously in the two last rows of the combustion chamber 110 ahead of the entry or the transfer to the vanes 130 or the first rotor blade row 120 of stage I, are configured so as to be increasingly thicker in the flow direction 11 such that a spoiler effect results. Close to the rotor hub, only one combustion chamber brick 604 is advantageously configured in the shape of a spoiler, whereas further radially distal, at the outer end of the combustion chamber 110, at least the penultimate and the last row of the combustion chamber bricks 603, 605 conjointly have a gradual increase in thickness in the flow direction.

This is however not intended to be limiting.

As a result of this spoiler effect, less erosion as well as a constriction of the hot-gas flow occurs, this leading to an increase in the rate of efficiency.

Service Life/Efficiency

Figure 15:
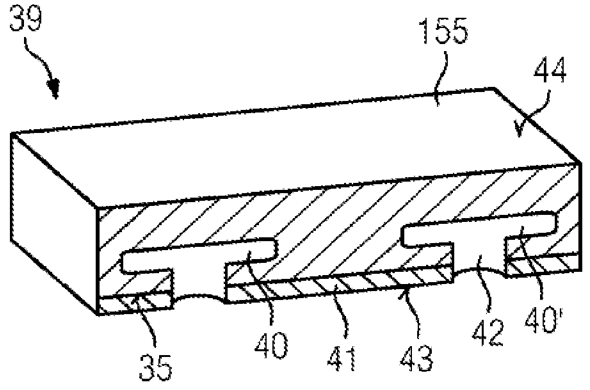
FIG. 15 shows a combustion chamber brick.
Figure 16:
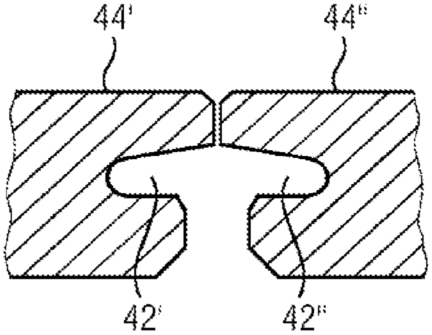
FIGS. 16, 17 show in each case a gap between two combustion chamber bricks according to FIG. 15.
Figure 17:
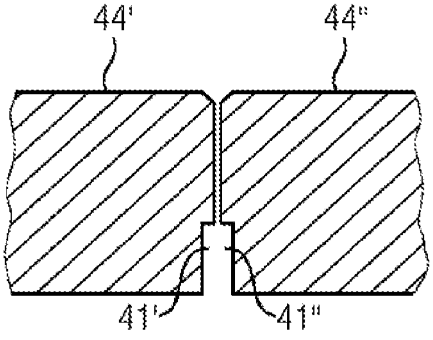

FIG. 15 shows a combustion chamber brick 155 having a lateral face 35, whereas FIGS. 16, 17 are sectional illustrations of FIG. 15.

FIG. 15 shows the lateral face 35 of the combustion chamber brick 155 such as is used in a combustion chamber 110, wherein a lateral face 35 has two elongate depressions 40, 40', in which a mounting engages from the rear side, and a corresponding continuous opening 42 onto the rear side 43 of the combustion chamber brick 155 that lies opposite the upper side 44.

An undercut 41 is present along the lateral face having the depressions 40 on the rear side 43 of the combustion chamber brick 155.

A section through two combustion chamber bricks according to FIG. 15 placed next to one another is illustrated in FIG. 16, said section being along the continuous opening 42', 42", whereas a gap, or an elongate depression 40, respectively, between two combustion chamber bricks 155 according to FIG. 15 is illustrated in FIG. 17, said gap or elongate depression 40 being outside the opening 42.

This leads to a reduced consumption of coolant because there is less cooling input.

Service Life/Efficiency

Figure 18:
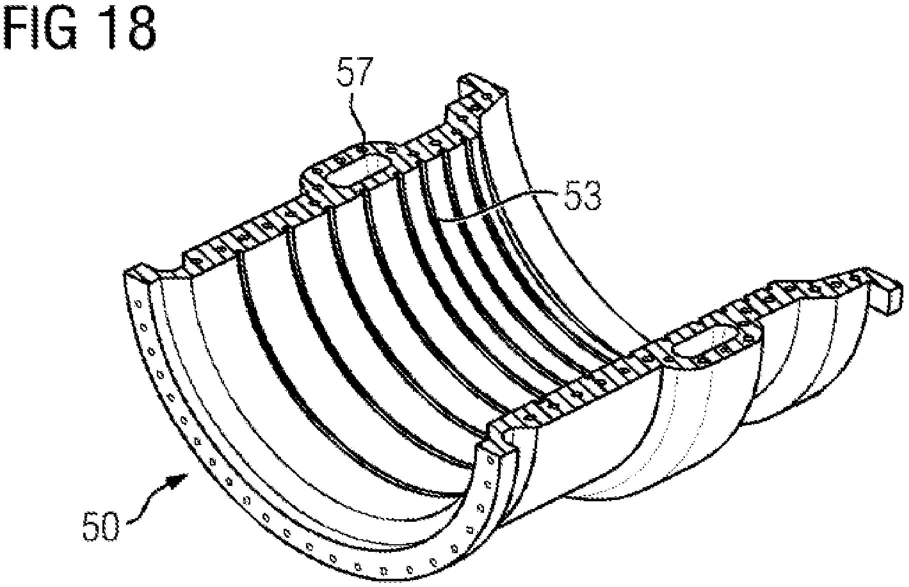
FIGS. 18, 19 show a housing having an additional seal incorporated.

FIG. 18 shows a lower turbine housing part 550 having the vane depressions 553 and duct 557 in the contact face 600 for the other, upper housing half.

Figure 19:
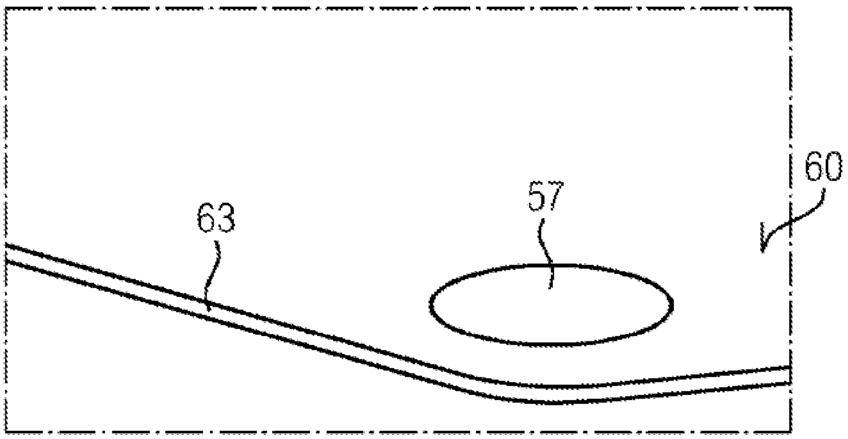

One or a plurality of additional depressions 630 and a seal are incorporated in this contact face 600 so as to reduce leakages in this region (FIG. 19).

Efficiency

Figure 20:
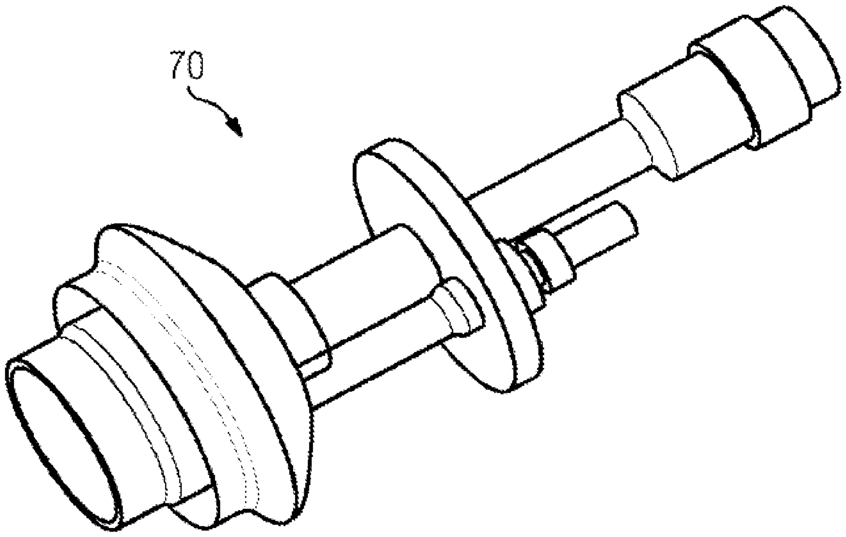
FIGS. 20, 21 show a burner having modified vanes of the swirler.

FIG. 20 shows a burner 70 which has a swirler in which air and fuel are mixed with one another.

Figure 21:
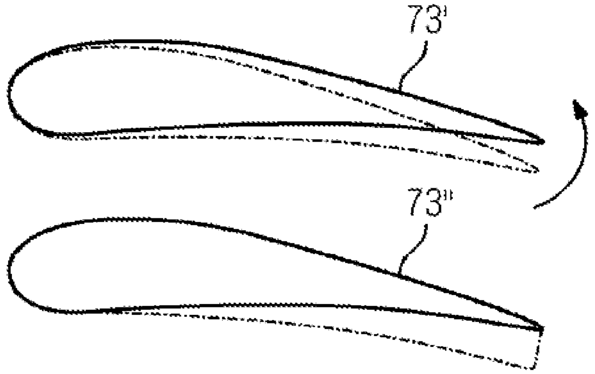

Shown in FIG. 21 are two different vanes 73', 73" of the swirler that point from the first position to a second position at another, modified, flatter angle (73'), and/or a torsion of the vane 73" along an outlet edge so as to achieve improved swirling.

The original position of the vane of the swirler is indicated by dashed lines on the vane 73', whereas the dashed line on the vane 73" indicates how the latter is torsioned along the longitudinal axis thereof, the latter running parallel to the inlet edge.

Service Life/Efficiency

Gas turbines can be operated as stand-alone units in order to operate a generator, but are often also operated in combination with steam turbines in a combined cycle installation.

Figure 22:
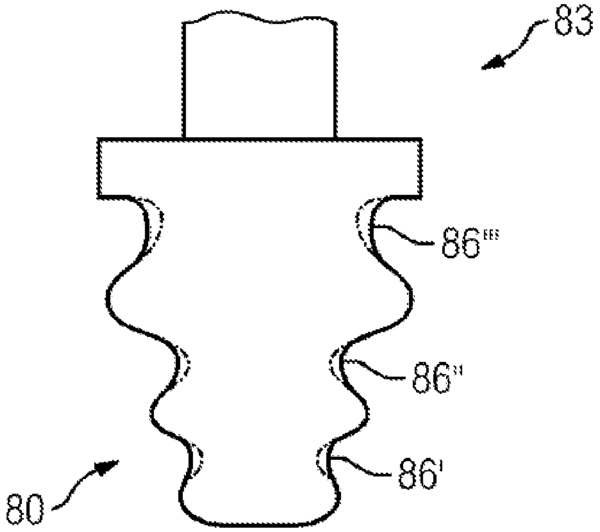
FIG. 22 shows a modified foot of a steam turbine.

As a result of the higher output generated by the gas turbine, the output capability of a steam turbine 6 has also to be adapted. This takes place in particular in that, as is illustrated in FIG. 22, a blade root of a turbine rotor blade 883, in particular in the three depressions 886', 886", 886'" of the fir-tree root 880, is provided with a larger radius than before.

Service Life

Figure 23:
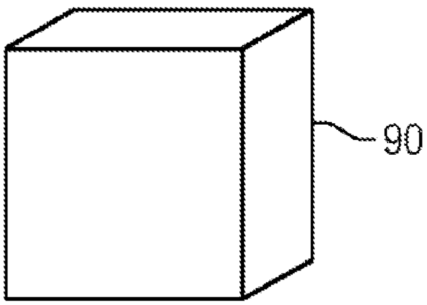
FIG. 23 shows a device for monitoring the combustion dynamic.

The combustion stability and the dynamic also have a very high influence on the service life of the system such that a control system 90 which registers the combustion dynamic and the acceleration is installed here (FIG. 23).

Servicing Measures

Some of the measures when servicing can be carried out conjointly because the measures conjointly can be carried out in a simpler manner and optionally in parallel.

Some measures can be offered to the operator of the installation and installed free of charge, in order for the next service intervals to be allowed to be extended or even skipped, or in order to reduce operating costs by increasing the rate of efficiency/a higher efficiency in which the service provider takes a share.

Considerations in terms of service life extension, efficiency, higher temperatures and the consumption of coolant play a role here.

In servicing measures of an energy conversion installation 1 which has at least a gas turbine 100, a generator 5 and optionally a steam turbine 6 having corresponding respective auxiliary apparatuses, service contracts which offer the operator of the energy conversion installation a service and maintenance contract which includes that a specific operating performance (service life) at specific output parameters in association with predefined service intervals is guaranteed, are often agreed.

For the service provider, this means that said service provider not only refurbishes items that have to be refurbished at the time, because said item can no longer be utilized or utilized only in the short term, so that said service provider when servicing also considers carrying out measures which permit the period up to the next service interval or to the next but one service interval to be extended.

For example, new burners which are calorized can also be installed when replacing turbine blades so that servicing measures pertaining to the burner component are not necessary at the next or at the next but one interval. Downtime is thus avoided.

Likewise, an extension of the service life can be carried out during a servicing measure, or a servicing measure can be brought forward, such that the next servicing measure is significantly shortened because measures relating to the disassembly of bearings, the disassembly of turbine blades, the replacement of combustion chamber bricks, modifications to the housing, etc., include different maintenance times.

This is also a result of certain measures being able to be carried out in parallel.

The flexible refurbishment comprises enhanced remote monitoring and diagnostic functions as part of the Omnivise Digital Service portfolio, as well as deliveries of spare parts, the maintenance according to plan, as well as output guarantees during the operating period of the installation. The combined gas and steam power station, by way of the high rate of efficiency under partial load and the high operating flexibility thereof, including the associated services in the context of this flexible refurbishment will function as an addition to the fluctuating renewable energy sources in the region.

The protection of the investments of the power plant operation as a result of a first-class service for the rotating machines is the key to the philosophy of a successful service provider.

The long-term flexible service takes one step further and offers a maintenance program which is individually tailored to the special needs and requirements. Whether the power plant operator wishes to maximize his/her production in that said power plant operator extends the time between the inspections, whether the inspections are to take place during the downtimes of the installation according to plan, whether the life-cycle costs are to be optimized by a replacement of components as a function of the state, or whether the operation is to take place free of predefined inspection dates: the long-term flexible refurbishment can be adapted to requirements.

The invention claimed is:

1. A method for carrying out servicing measures on an energy conversion installation having machines comprising: at least one gas turbine; at least one generator; and optionally at least one steam turbine; the method comprising:

carrying out repairs on at least one machine, comprising repairing a defective component or defective components or replacing the defective component or defective components by a new, identical component or components; and wherein, while carrying out the repairs, carrying out further measures for extending a service life and/or for optimizing the at least one machine or the components thereof;

wherein the at least one gas turbine has at least: a compressor; a combustion chamber; a hot-gas duct having a bladed rotor; and at least one rotor bearing of the rotor which, when viewed in a flow direction of the gas turbine machine, is at a beginning of the compressor; wherein the at least one gas turbine is modified by the method such that the rotor bearing is replaced with a new rotor bearing; wherein the new rotor bearing is at least 5% longer; or a new rotor bearing of at least 370 mm in length is installed, in particular wherein the new rotor bearing is at most 500 mm in length; and/or wherein the at least one gas turbine has at least: a compressor; a combustion chamber; a hot-gas duct having a bladed rotor; at least one burner for the combustion chamber, wherein the at least one gas turbine is modified by the method such that a fuel-supplying means, in particular pipes, are at least partially, in particular completely, provided on an inside with a diffusion coating, in particular calorized; or the fuel-supplying means, in particular pipes having the diffusion coating on the inside, in particular calorized on the inside, are installed; and/or wherein the at least one gas turbine has at least: a compressor; a combustion chamber; a hot-gas duct having a bladed rotor; wherein the at least one gas turbine is modified by the method such that the compressor has a compressor housing which is, or will be, configured in two parts; and in particular in which an internal compressor housing as a blade carrier made from a first material, in particular made from steel, is installed, most particularly made from cast steel, is installed; and an external compressor housing as a blade carrier comprises a second material distinctly different from the first material, in particular gray cast iron; and/or in which the internal compressor housing is replaced by gray cast iron; and/or wherein the at least one gas turbine has at least: a compressor; a combustion chamber; a hot-gas duct having a bladed rotor, having stages (I, II, III, IV) of rotor blades and vanes; wherein the at least one gas turbine is modified by the method such that the rotor blades and vanes resistant to higher temperatures and with, in particular, improved cooling are installed, in particular in stages (I, II); and/or in which rotor blades or vanes which have a directionally solidified microstructure, in the form of a columnar solidified microstructure, are installed in the hot-gas duct; in particular only the two first stages (I, II), most particularly only the first stage (I); and/or in which a segmented ceramic layer based on yttrium-stabilized zirconium oxide is applied to the rotor blades and vanes; and/or in which the rotor blades and vanes that have a monocrystalline microstructure for a metallic substrate are installed, in particular only the first two stages (I, II); and/or in which the ceramic coating comprises partially stabilized yttrium-stabilized zirconium oxide, having a porosity of 12±4%; and/or in which on rotor blades or vanes in the hot-gas duct a TBC is present without segmentation on the rotor vanes or blades; and/or in which a blade tip in a depression has a step-shaped shoulder which directly adjoins a web of an intake side, and thus represents additional material in the depression; wherein a cooling air bore for improved cooling of the blade tip runs from an interior of the rotor blade through the shoulder; and/or wherein the at least one gas turbine has at least: a compressor; a combustion chamber; a hot-gas duct having a bladed rotor; having stages (I, II, III, IV) of rotor blades and vanes; wherein the at least one gas turbine is modified by the method such that the rotor blades and vanes, in particular in stages (I, II), that have cooling bores on the lateral faces of blade platforms are installed; and/or wherein the at least one gas turbine has at least: a compressor; a combustion chamber; a hot-gas duct having a bladed rotor; having stages (I, II, III, IV) of rotor blades and vanes, wherein the at least one gas turbine is modified by the method such that the rotor blades are installed; wherein the blade tip of the rotor blades, in particular of stages (I, II), is cooled, in particular by cooling bores in the blade tip; and/or wherein the at least one gas turbine has at least: a compressor; a combustion chamber; a hot-gas duct having a bladed rotor, having stages (I, II, III, IV) of rotor blades and vanes; wherein the at least one gas turbine is modified by the method such that the rotor blades of stage (IV) that are not cooled are installed, in particular the vanes of stage (III) are also not cooled; and/or wherein the at least one gas turbine has at least: a compressor; a combustion chamber; a hot-gas duct having a bladed rotor; wherein the at least one gas turbine is modified by the method such that, when viewed in the flow direction, a front plenum and a rear plenum are present outside the hot-gas duct, said front plenum and rear plenum for technical reasons having different pressures; wherein the front plenum in the flow direction is present behind the rotor blade of stage (III) and above the vane of stage (IV); and either ducts which were present in the center of stage (IV), between the rotor blade and the vane, and previously used for cooling turbine vanes and blades of stage (IV), or for supplying cooling air, are closed, and a new long duct from the rear plenum is retroactively incorporated in the blade carrier; or a new blade carrier is provided and installed, said new blade carrier now having only one such duct; and/or wherein the at least one gas turbine has at least: a compressor; a combustion chamber having combustion chamber bricks or heat shields; a hot-gas duct having a bladed rotor; wherein the at least one gas turbine is modified by the method such that a gap between a heat shield and a vane of stage (I) of a motor a radius on a flow-side end of the heat shield and the opposite radius of the vane of stage (I) are identically embodied, so as to avoid a projection or an undercut in the heat shield, in which dirt could accumulate or erosion occurs; and/or wherein the at least one gas turbine has at least: a compressor; a combustion chamber; a hot-gas duct having a bladed rotor; wherein the at least one gas turbine is modified by the method such that a vane carrier having a seal assembly made from elements is installed or modified, said seal assembly leading to a reduced consumption of cooling air; wherein the elements of the vane carrier have a gap, said gap being configured as a labyrinth or in an S-shaped manner; wherein a front element in the flow direction has a first cam, and a second rear element in the flow direction has a second cam configured above the first cam such that an S-shaped gap is formed, as a result of which an opening of the gap, when viewed in the flow direction, lies at the rear of the hot-gas duct; and/or wherein the at least one gas turbine has at least: a compressor; a combustion chamber having heat shields or combustion chamber bricks; a hot-gas duct having a bladed rotor; wherein the at least one gas turbine is modified by the method such that the combustion chamber bricks are installed, said combustion chamber bricks being configured so as to generate a spoiler effect; and/or wherein the at least one gas turbine has at least: a compressor; a combustion chamber having combustion chamber bricks; a hot-gas duct having a rotor; wherein the at least one gas turbine is modified by the method such that the combustion chamber bricks are installed that on two opposite lateral faces of the combustion chamber brick receive two mutually separated depressions which serve for the combustion chamber brick to be mechanically engaged from a rear side; and/or wherein the at least one gas turbine has at least: a compressor; a combustion chamber having combustion chamber bricks; a hot-gas duct having a bladed rotor; a housing part for the hot-gas duct; wherein the at least one gas turbine is modified by the method such that a depression for a seal is placed in a contact face and the housing is closed again; and/or wherein the at least one gas turbine has at least: a compressor; a combustion chamber having combustion chamber bricks and burners; a hot-gas duct having a rotor; wherein the at least one gas turbine is modified by the method such that modified vanes are installed in a swirler of the burner, said modified vanes having a smaller opening angle in comparison to previous vanes, and an outlet edge being rotated in relation to a longitudinal axis of the blade; and/or wherein the at least one gas turbine has at least: a compressor; a combustion chamber; a hot-gas duct having a bladed rotor; wherein the at least one gas turbine is modified by the method such that a system for monitoring the combustion dynamic and combustion accelerations of the combustion chamber and burner is retrofitted so as to reduce or avoid combustion instabilities; and/or in which the steam turbine is modified, said steam turbine being indirectly or directly connected to a gas turbine; wherein the steam turbine has turbine blades; wherein the turbine blade has a root having depressions; wherein the depressions have a larger radius in comparison to previously installed turbine blades to be replaced.

2. The method as claimed in claim 1, wherein the defective component or the defective components comprise turbine blades and/or the coatings thereof; and/or burners or burner components; and/or compressor blades and/or the coatings thereof; and/or combustion chamber bricks.

3. The method as claimed in claim 1, wherein the defective components comprise only turbine blades.

4. The method as claimed in claim 1, wherein the defective components comprise only turbine blades and/or the coatings thereof as well as burner or burner components.

5. The method as claimed in claim 1, wherein the further measures comprise only measures for extending the service life of machines or the components thereof.

6. The method as claimed in claim 1, wherein the further measures comprise only measures for optimizing machines or the components thereof.

7. The method as claimed in claim 1, wherein the further measures comprise both measures for extending the service life of machines or components, and measures for optimizing machines or components.

8. The method as claimed in claim 1, wherein in the further measures comprise at least one measure, in particular at least two identical, or at least two different, measures for extending the service life of machines or the components thereof, wherein the components are selected from the group comprising: bearing of the rotor, burner, compressor blade, compressor housing, turbine blades, gas turbine housing, blade carrier, heat shields or combustion chamber bricks, seals, transition combustion chamber to turbine, cooling, and/or monitoring apparatuses.

9. The method as claimed in claim 1, wherein in the further measures comprise at least one measure, in particular at least two identical, or at least two different, measures for optimizing machines or the components thereof for increased efficiency and/or improved cooling, wherein the components are selected from the group comprising: burner, compressor blade, compressor housing, turbine blades, gas turbine housing, blade carrier, heat shields or combustion chamber bricks, seals and/or transition combustion chamber to turbine.

10. An installation comprising:

an energy generation installation or an energy conversion installation, having machines comprising: at least one gas turbine; at least one generator; and optionally at least one steam turbine;

wherein, upon carrying out servicing measures on the installation comprising: carrying out repairs on at least one machine, comprising repairing a defective component or defective components or replacing the defective component or defective components by a new, identical component or components; and wherein, while carrying out the repairs, carrying out further measures for extending a service life and/or for optimizing the at least one machine or the components thereof, the at least one gas turbine comprises:

a compressor; a combustion chamber; a hot-gas duct having a bladed rotor; and at least one rotor bearing of the rotor which, when viewed in a flow direction of the gas turbine machine, is at a beginning of the compressor; wherein the rotor bearing is at least 370 mm in length, in particular is at most 500 mm in length; and/or a compressor; a combustion chamber; a hot-gas duct having a bladed rotor; at least one burner for the combustion chamber, in which a fuel-supplying means, in particular pipes, at least partially, in particular completely, have on an inside a diffusion coating, in particular are calorized; and/or a compressor; a combustion chamber; a hot-gas duct having a bladed rotor; wherein the compressor has a compressor housing, which is configured in two parts and has an internal compressor housing as a blade carrier, which comprises a first material, in particular steel, most particularly cast steel; and an external compressor housing as a blade carrier comprises a second material distinctly different from the first material, in particular gray cast iron; or in which the external compressor housing comprises gray cast iron; and/or a combustion chamber; a hot-gas duct having a bladed rotor; having stages (I, II, III, IV) of rotor blades and vanes; wherein the rotor blades and vanes, in particular of stages (I, II), are resistant to higher temperatures, in particular have improved cooling; and/or in which the rotor blades or vanes in the hot-gas duct have a directionally solidified microstructure, in the form of a columnar solidified microstructure, in particular only the two first stages (I, II), most particularly only the first stage (I); and/or in which a segmented ceramic layer based on yttrium-stabilized zirconium oxide is present on the rotor blades and vanes; and/or in which the rotor blades and vanes for a metallic substrate have a monocrystalline microstructure, in particular only the first two stages (I, II); and/or in which the ceramic coating comprises partially stabilized yttrium-stabilized zirconium oxide, having a porosity of 12±4%; and/or having a TBC without segmentation on the vanes or rotor blades; and/or in which a blade tip in a depression has a step-shaped shoulder which directly adjoins a web of an intake side, and thus represents additional material in the depression; wherein a cooling air bore for improved cooling of the blade tip runs from an interior of the rotor blade through the shoulder; and/or a compressor; a combustion chamber; a hot-gas duct having a bladed rotor; having stages (I, II, III, IV) of rotor blades and vanes; in which the rotor blades and vanes, in particular of stages (I, II), have cooling bores on the lateral faces of blade platforms; and/or a compressor; a combustion chamber; a hot-gas duct having a bladed rotor; having stages (I, II, III, IV) of rotor blades and vanes; wherein the blade tip, in particular of stages (I, II), is cooled, in particular by cooling bores in the blade tip; and/or a compressor; a combustion chamber; a hot-gas duct having a bladed rotor; having stages (I, II, III, IV) of rotor blades and vanes; wherein the rotor blade of stage (IV) does not have to be cooled, in particular the vane of stage (III) is not cooled; and/or a compressor; a combustion chamber; a hot-gas duct having a bladed rotor; in which, when viewed in the flow direction, a front plenum and a rear plenum are present outside the hot-gas duct, said front plenum and rear plenum for technical reasons having different pressures; wherein the front plenum in the flow direction is present behind the rotor blade of stage (III) and above the vane of stage (IV); and a long duct from the rear plenum is present in the blade carrier; said long duct cooling the stage (III) from the rear plenum; and/or a compressor; a combustion chamber having combustion chamber bricks or heat shields; a hot-gas duct having a bladed rotor; having a gap between a heat shield and a vane of stage (I) of the rotor; wherein a radius on a flow-side end of the heat shield and the opposite radius of the vane of stage (I) are identically embodied, so as to avoid a projection or an undercut in the heat shield, in which dirt could accumulate or erosion occurs; and/or a compressor; a combustion chamber; a hot-gas duct having a bladed rotor; a vane carrier having a seal assembly made from elements, said seal assembly leading to a reduced consumption of cooling air; wherein the elements of the vane carrier have a gap, said gap being configured as a labyrinth or in an S-shaped manner; wherein a front element in the flow direction has a first cam, and a second rear element in the flow direction has a second cam configured above the first cam such that an S-shaped gap is formed, as a result of which an opening of the gap, when viewed in the flow direction, lies at the rear of the hot-gas duct; and/or a compressor; a combustion chamber having heat shields or combustion chamber bricks; a hot-gas duct having a bladed rotor; wherein the combustion chamber at the flow-side end of the heat shields or combustion chamber bricks is configured such that said heat shields or combustion chamber bricks generate a spoiler effect; and/or a compressor; a combustion chamber having combustion chamber bricks; a hot-gas duct having a bladed rotor; wherein two mutually separated depressions are configured on two opposite lateral faces of the combustion chamber brick, said depressions serving for the combustion chamber brick to be mechanically engaged from a rear side; and/or a compressor; a combustion chamber having combustion chamber bricks; a hot-gas duct having a bladed rotor; an upper and a lower housing part for the hot-gas duct; wherein housing parts on a contact face, in particular in a region of vane depressions, have a depression having a seal; and/or a compressor; a combustion chamber having combustion chamber bricks; a hot-gas duct having a bladed rotor; wherein the combustion chamber is disposed a burner, said burner having a swirler having vanes; wherein an opening angle of the vane is reduced and the blade of the vane is along an outlet edge of the blade; and/or in a combined cycle installation, a compressor; a combustion chamber; a hot-gas duct having a bladed rotor; and a steam turbine; wherein an exhaust gas of the gas turbine machine is used indirectly for generating steam in a steam turbine; wherein the steam turbine has blades having a blade root; wherein the depressions have a larger radius; and/or a compressor; a combustion chamber; a hot-gas duct having a bladed rotor; wherein a system which monitors the combustion dynamic and accelerations emanating from the combustion and the combustion chamber is installed.

11. The installation as claimed in claim 10, wherein the defective component or the defective components comprise turbine blades and/or the coatings thereof; and/or burners or burner components; and/or compressor blades and/or the coatings thereof; and/or combustion chamber bricks.

12. The installation as claimed in claim 10, wherein the defective components comprise only turbine blades.

13. The installation as claimed in claim 10, wherein the defective components comprise only turbine blades and/or the coatings thereof as well as burner or burner components.

14. The installation as claimed in claim 10, wherein the further measures comprise only measures for extending the service life of machines or the components thereof.

15. The installation as claimed in claim 10, wherein the further measures comprise only measures for optimizing machines or the components thereof.

16. The installation as claimed in claim 10, wherein the further measures comprise both measures for extending the service life of machines or components, and measures for optimizing machines or components.

17. The installation as claimed in claim 10, wherein in the further measures comprise at least one measure, in particular at least two identical, or at least two different, measures for extending the service life of machines or the components thereof, wherein the components are selected from the group comprising: bearing of the rotor, burner, compressor blade, compressor housing, turbine blades, gas turbine housing, blade carrier, heat shields or combustion chamber bricks, seals, transition combustion chamber to turbine, cooling, and/or monitoring apparatuses.

18. The installation as claimed in claim 10, wherein in the further measures comprise at least one measure, in particular at least two identical, or at least two different, measures for optimizing machines or the components thereof for increased efficiency and/or improved cooling, wherein the components are selected from the group comprising: burner, compressor blade, compressor housing, turbine blades, gas turbine housing, blade carrier, heat shields or combustion chamber bricks, seals and/or transition combustion chamber to turbine.

* * * * *